US007002963B1

(12) United States Patent
Buyukkoc et al.

(10) Patent No.: US 7,002,963 B1
(45) Date of Patent: *Feb. 21, 2006

(54) INTEGRATED SWITCHING AND FACILITY NETWORKS

(75) Inventors: Cagatay Buyukkoc, Holmdel, NJ (US);
David J Houck, Colts Neck, NJ (US);
Pravin Kumar Johri, Aberdeen, NJ (US); Kathleen S. Meier-Hellstern, Cranbury, NJ (US); Steven M. Michelson, Freehold, NJ (US); Rodolfo Alberto Milito, Los Gatos, CA (US)

(73) Assignee: AT&T Corp., Bedminster, NJ (US)

( * ) Notice: Subject to any disclaimer, the term of this patent is extended or adjusted under 35 U.S.C. 154(b) by 244 days.

This patent is subject to a terminal disclaimer.

(21) Appl. No.: 10/233,739

(22) Filed: Sep. 3, 2002

Related U.S. Application Data

(63) Continuation-in-part of application No. 09/219,319, filed on Dec. 23, 1998, now Pat. No. 6,463,062, which is a continuation-in-part of application No. 08/974,172, filed on Nov. 19, 1997, now Pat. No. 6,081,506.

(51) Int. Cl.
*H04L 12/56* (2006.01)

(52) U.S. Cl. .............................. 370/395.1; 370/395.3; 370/395.52; 370/401; 370/409

(58) Field of Classification Search ................ 370/235, 370/395.1, 395.2, 395.21, 395.3, 395.52, 370/401, 402, 409
See application file for complete search history.

(56) References Cited

U.S. PATENT DOCUMENTS

| 6,081,506 A | * | 6/2000 | Buyukkoc et al. ........... 370/235 |
| 6,463,062 B1 | * | 10/2002 | Buyukkoc et al. ....... 370/395.1 |
| 6,502,137 B1 | * | 12/2002 | Peterson et al. ............ 709/229 |
| 6,647,430 B1 | * | 11/2003 | Minyard et al. ............ 709/251 |
| 6,650,631 B1 | * | 11/2003 | Benash et al. .............. 370/352 |

OTHER PUBLICATIONS

"Transport of Layer 2 Frames Over MPLS", http://www.watersprings.org/pub/id/draft-martini-l2circuit-trans-mpls-00.txt., Dec. 1999.
"Transport of Layer 2 Frames Over MPLS", http://www.watersprings.org/pub/id/draft-martini-l2circuit-trans-mpls-01.txt., May 2000.

(Continued)

*Primary Examiner*—Dang Ton
*Assistant Examiner*—Shick Hom

(57) ABSTRACT

The problems associated with prior solutions for implementing ATM or IP/MPLS in a large-scale network are overcome by providing an efficient means by which capacity in the network is more fully shared without adversely affecting call or session setup latency, and at the same time simplifying network operations. This is achieved by performing the functions of route setup, route allocation, and capacity management in a network at the edges (e.g., the interfaces existing between each ATM switch or IP/MPLS router and customers) of the network. In accordance with the principles disclosed herein, the edges contain nodes that form the interface between the ATM switches and IP/MPLS routers and the link(s) that interconnect them and the outside world. These nodes comprise controllers and other apparatus that in some cases may be incorporated in, or connected as adjuncts to, the ATM switches or IP/MPLS routers.

6 Claims, 14 Drawing Sheets

OTHER PUBLICATIONS

"Transport of Layer 2 Frames Over MPLS", http://www.watersprings.org/pub/id/draft-martini-l2circuit-trans-mpls-02.txt., Jul. 2000.

"Transport of Layer 2 Frames Over MPLS", http://www.watersprings.org/pub/id/draft-martini-l2circuit-trans-mpls-03.txt., Sep. 2000.

"Transport of Layer 2 Frames Over MPLS", http://www.watersprings.org/pub/id/draft-martini-l2circuit-trans-mpls-04.txt., Nov. 2000.

"Transport of Layer 2 Frames Over MPLS", http://www.watersprings.org/pub/id/draft-martini-l2circuit-trans-mpls-05.txt., Feb. 2001.

"Transport of Layer 2 Frames Over MPLS", http://www.watersprings.org/pub/id/draft-martini-l2circuit-trans-mpls-06.txt., May 2001.

"Transport of Layer 2 Frames Over MPLS", http://www.watersprings.org/pub/id/draft-martini-l2circuit-trans-mpls-07.txt., Jul. 2001.

* cited by examiner

900

1200

900

US 7,002,963 B1

INTEGRATED SWITCHING AND FACILITY NETWORKS

RELATED APPLICATIONS

This application is a continuation-in-part of U.S. patent application Ser. No. 09/219,319, filed on Dec. 23, 1998, now U.S. Pat. No. 6,463,062, which in turn is a continuation-in-part of U.S. patent application Ser. No. 08/974,172, filed on Nov. 19, 1997, now U.S. Pat. No. 6,081,506, all of which are incorporated by reference.

BACKGROUND OF THE INVENTION

ATM (Asynchronous Transfer Mode) is an exemplary telecommunications methodology using datagrams. As the volume of voice and voice-band calls is increasing markedly, and network providers are being challenged to offer these "plain old telephone" services at competitive prices, ATM presents an opportunity to reduce costs, and is therefore being considered for carrying circuit-switched voice traffic.

Conventionally, a circuit switched network is managed by formulating a logical view of the network that includes a link between most pairs of network switches, and the network is managed at the logical level. The logical view does not necessarily correspond to the actual, physical, network. The logical connections over which routing is performed ride on a facility network. The facility level contains the physical switches and transmission resources. The connections demanded at the logical level are mapped into demands on the facility network. Routes that appear as direct at the logical level may pass through many cross-connects at the physical level.

The partitioning of a circuit-switched network into logical and physical layers results in significant inefficiencies. Physical diversity is difficult to plan for such networks due to the indirect mapping between the logical and physical layers, and such networks have high operations costs due to the constant need to resize trunk groups between switch pairs as the load changes or shifts. Also, sharing of bandwidth is limited to the possible alternate paths at the logical layer. Finally, such networks are difficult to scale as network traffic increases because each switch that is added to the network must be interconnected to all other switches at the logical layer, trunks on existing switches must be re-homed to the new switch, and the routing tables at all other switches in the network must be updated. All of this creates substantial operational load on the network provider. Since facilities are in units of T3 capacity, fragmentation of trunk groups also increases with the size of the network.

ATM networks have the potential to eliminate some of the inefficiencies in traditional circuit-switched networks. In an ATM implementation that creates circuit connections, the logical and physical network separation may or may not be maintained. Voice calls in such a network may be treated as ATM virtual circuits, which may be either Constant Bit Rate (CBR) or Variable Bit Rate (VBR) arrangements, depending on the voice coding scheme. These virtual circuits may be set up using standardized ATM setup procedures and routing protocols as, for example, in the Private Network-to-Network Interface (PNNI) specification. However, the standard procedures of an ATM network require the ATM switches in the network to perform a substantial amount of computation, which is burdensome and which makes it difficult to operate the network at high load volumes.

The ATM standard defines a Connection Admission Control (CAC) to manage node-by-node call admission based on knowledge of congestion at the node. The CAC is used to insure that calls receive their Grade-of-Service guarantees on call- and cell-level blocking. The Private Network-to-Network Interconnection (PNNI) protocol in ATM uses a Generalized Call Admission Control (GCAC) to perform the call admission control function at network edges based on knowledge of congestion internal to the network. Both of the described ATM schemes provide capacity management in a distributed manner.

IP (Internet Protocol) is another exemplary telecommunications methodology using datagrams. Multi-Protocol Label Switching (MPLS) is a way to add ATM-like functionality to IP by attaching labels containing specific routing and Quality of Service (QoS) information to each data packet and using label switched paths for circuits. That is, MPLS combines the intelligence of IP routing with the speed of ATM switching. A label allows forwarding of data packets using predetermined paths according to specific QoS levels. The QoS level is derived from the QoS information in the received IP packet.

SUMMARY OF THE INVENTION

The problems associated with prior solutions for implementing ATM or IP/MPLS in a large-scale network are overcome by providing an efficient means by which capacity in the network is more fully shared without adversely affecting call or session setup latency, and at the same time simplifying network operations. This is achieved by performing the functions of route setup, route allocation, and capacity management in a network at the edges of the network. By "edges" what is meant is the interface between an ATM switch or a IP/MPLS router of the network and another that is other than another ATM switch or IP/MPLS router of the network; for example, the interface between each ATM switch or IP/MPLS router and customers. In accordance with the principles disclosed herein, the edges contain nodes that form the interface between the ATM switches and IP/MPLS routers and the link(s) that interconnect them and the outside world. These nodes comprise controllers and other apparatus that in some cases may be incorporated in, or connected as adjuncts to, the ATM switches or IP/MPLS routers.

In an ATM network, edge nodes assign calls to virtual paths based on the destination of the call and the current load status of each of a number of preselected paths. Thus, each call is assigned a VPI (Virtual Path Identifier) corresponding to the path chosen and a VCI (Virtual Circuit Identifier) corresponding to the identity of the call at that edge node. The ATM backbone nodes route calls based solely on the VPI. Destination based routing allows VPIs to be shared among routes from different sources to the same destination.

Capacity management and load balancing is achieved through a Fabric Network Interface (FNI) that is present in each of the edge nodes along with a Centralized FNI (CFNI), that maintains backbone link status. In an ATM network, the FNI is responsible for keeping track of the load on each access link from its edge node to the backbone ATM switch it homes onto, as well as the load on each, backbone link of the calls it originated. This load is measured in normal bandwidth requirements for CBR services and could be measured in effective bandwidths for other services. The FNI is also responsible for periodically sending its information to the CFNI. The CFNI collects the received information and calculates the bandwidth used on each backbone link. It then computes a link status for each access and backbone link and sends this status information to each FNI. This information assists the FNIs in carrying out their tasks.

An ATM network includes a plurality of interconnected backbone ATM switches, where each backbone ATM switch is connected to at least one other backbone ATM switch by a β-link. The ATM network also has a plurality of edge nodes, where each edge node is connected to at least one backbone ATM switch by an α-link. A routing map is provided that defines a first pre-provisioned path that leads from a first of the backbone ATM switches, along one or more β-links, to a second of the backbone ATM switches, then along an α-link to a destination edge node, which is one of the plurality of edge nodes. The first pre-provisioned path also includes a number of intermediary backbone ATM switches, i.e., backbone ATM switches in addition to the first and second backbone ATM switches, equal to the number of β-links included in the preprovisioned path minus one. The first pre-provisioned path is associated with a first virtual path identifier (VPI). A routing status database, logically connected to each of the edge nodes, maintains the routing map and tracks the congestion status of each α-link and each β-link in the ATM network. The first VPI defines a first path from a first source node, which is one of the plurality of edge nodes, to the destination edge node. This first path runs from the first source edge node to a backbone ATM switch selected from the group consisting of the first backbone ATM switch and the intermediary backbone ATM switches included in the first pre-provisioned path, and then along the first pre-provisioned path to the destination edge node. The first VPI also defines a second path from a second source node, which is one of the plurality of edge nodes, to the destination edge node. This second path runs from the second source edge node to a backbone ATM switch selected from the group consisting of the first backbone ATM switch and the intermediary backbone ATM switches included in the first pre-provisioned path, and then along the first pre-provisioned path to the destination edge node. As a result, destination based routing to the destination node is implemented. The first VPI defines a plurality of paths from a plurality of edge nodes to the destination node, similar to the way that the branches of a tree converge to a single trunk.

In an ATM method for setting up a communication from a first edge node, across a network that uses direct virtual path routing, to a second edge node, the first edge node receives a request to set up the call. The second edge node is identified as the destination of the call, based on the request. A first virtual path identifier (VPI) is obtained that defines a first path from the first edge node across the network to the second edge node. A second VPI is obtained that defines a second path from the second edge node across the network to the first edge node. The first and second VPIs are selected by a routing status database. A first virtual channel identifier (VCI) within the first VPI is selected. A second virtual channel identifier (VCI) within the second VPI is selected. Data is transmitted from the first edge node to the second edge node using the first VPI and first VCI, and from the second edge node to the first edge node using the second VPI and second VCI. ATM switches are provided to carry out the method.

Similarly, in an IP/MPLS network, edge nodes assign calls or sessions or IP flows to label switched paths based on the destination of the session and the current load status of each of a number of pre-selected paths. Thus, each session is assigned a stack of labels corresponding to the path chosen and a label identifier corresponding to the identity of the session at that edge node. That is, the label identifier identifies the session in a predetermined direction. The IP/MPLS router nodes route IP packets belonging to sessions based solely on the stack of labels and label identifiers. Destination based routing allows the stacks of labels to be shared among routes from different sources to the same destination.

In an IP/MPLS network, the FNI is responsible for keeping track of the load on each access link from its edge node to the IP/MPLS router it homes onto, as well as the load on each, backbone link of the sessions it originated. In the IP/MPLS network, the first pre-provisioned path is associated with a first stack of labels. A first stack of labels defines a first path from a first source node, which is one of the plurality of edge nodes, to the destination edge node. This first path runs from the first source edge node to a IP/MPLS router selected from the group consisting of the first IP/MPLS router and the intermediary IP/MPLS routers included in the first pre-provisioned path, and then along the first pre-provisioned path to the destination edge node. A second stack of labels defines a second path from a second source node, which is one of the plurality of edge nodes, to the destination edge node. This second path runs from the second source edge node to an IP/MPLS router selected from the group consisting of the first IP/MPLS router and the intermediary IP/MPLS backbones routers included in the first pre-provisioned path, and then along the first pre-provisioned path to the destination edge node. As a result, destination based routing to the destination node is implemented. Like the VPIs discussed above, the stack of labels defines a plurality of paths from a plurality of edge nodes to the destination node, similar to the way that the branches of a tree converge to a single trunk.

In an IP/MPLS method for setting up a communication from a first edge node, across a network that uses direct virtual path routing, to a second edge node, the first edge node receives a request to set up the session. The second edge node is identified as the destination of the session, based on the request. A first stack of labels is obtained that defines a first path from the first edge node across the network to the second edge node. A second stack of labels is obtained that defines a second path from the second edge node across the network to the first edge node. The first and second stack of labels are selected by a routing status database. A first label identifier is selected that identifies the session in the first direction from the first edge node to the second edge node. Since an IP packet is not limited to 48 bytes of payload like an ATM cell, the label identifier can be carried inside the IP packet as data and need not necessarily be carried as an explicit label. A second label identifier is selected that identifies the session in a second direction from the second edge node to the first edge node. Data is transmitted from the first edge node to the second edge node using the first stack of labels and the first label identifier, and from the second edge node to the first edge node using the second stack of labels and the second label identifier. IP/MPLS backbone routers are provided to carry out the method.

DETAILED DESCRIPTION

The illustrative embodiments disclosed below in FIGS. 1–10 speaks in terms of an ATM network and ATM cells, but it should be understood that any packet network, such as a network which works in accordance with the IP protocol, can employ the same principles. In such case of an IP protocol, such as the IP/MPLS protocol as disclosed in FIGS. 11–16, it should be appreciated that the ATM switches shown in the ATM network example would be replaced by IP/MPLS routers.

ATM Network

Direct Virtual Path Routing

A first group of embodiments describe a direct virtual path (DVP) routing mechanism.

Figure 1:
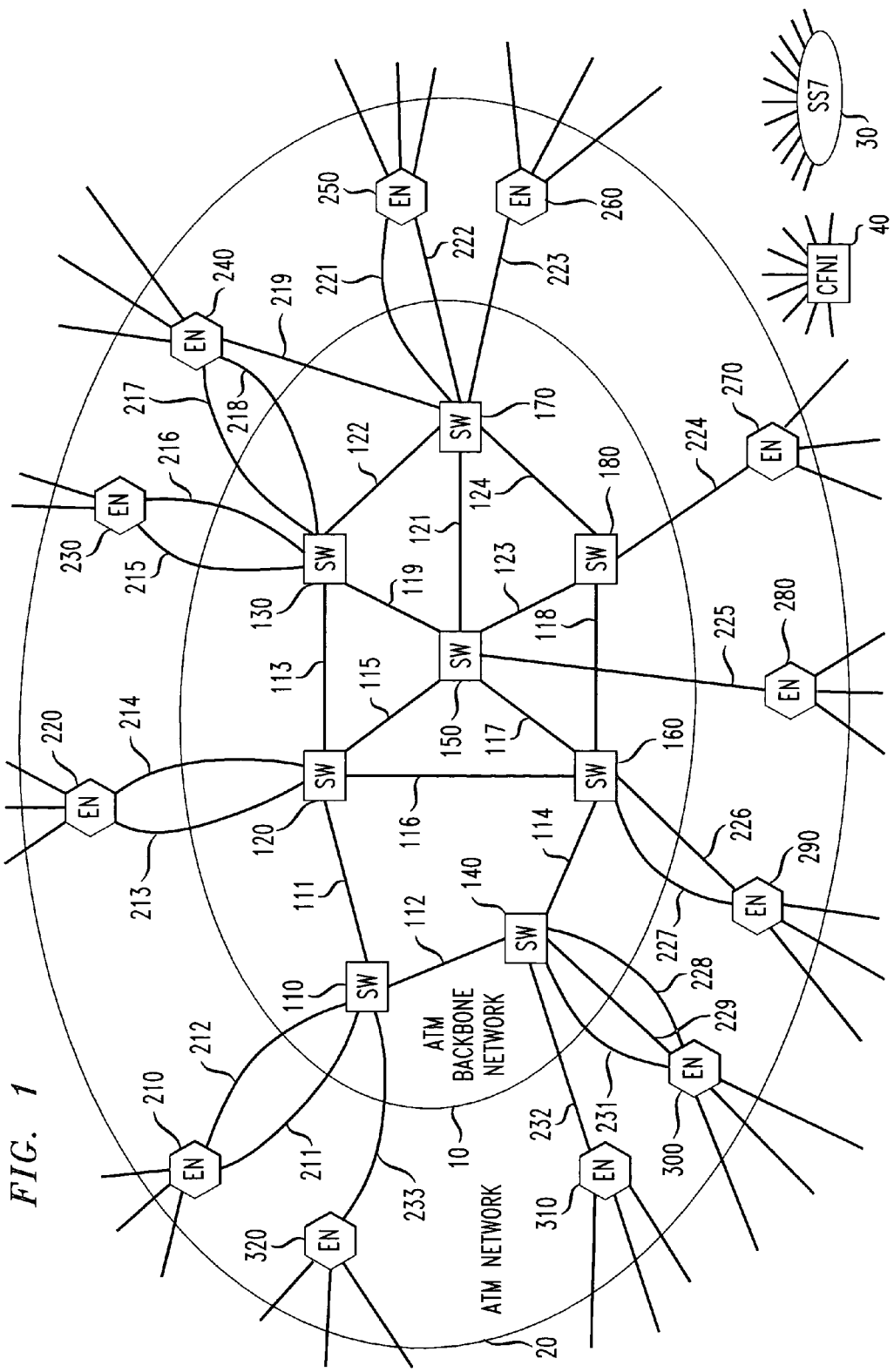
FIG. 1 illustrates a telecommunication system utilizing various exemplary embodiments of the present invention.

FIG. 1 illustrates an ATM network 20 which includes a core ATM backbone network 10. Backbone network 10 includes ATM switches 110–180 and backbone links, or links, 111–119 and 121–124. Network 20 also includes edge nodes 210–320 outside the ATM backbone network, and access links, or α links, 211–219, 221–229 and 231–233 which interconnect the edge nodes to the backbone ATM switches. An edge node, in the context of this disclosure, is a node that is interposed between customers, or other networks, and the ATM backbone network. In some networks, the edge node may be a physically distinct switch that is either a circuit or a packet switch. In other networks, it may simply be a logical portion of an ATM switch. That is, an edge node 210 can occupy a logical portion of an ATM switch that is part of the backbone network. The processing capability that relates strictly to routing of incoming ATM cells to outgoing links can be thus viewed to belong to the ATM switches, while the processing capability that relates to route set-ups, for example, can be viewed to belong to the edge nodes. Also, some capacity on certain links can be reserved and viewed to constitute α links and the remaining capacity can be viewed to constitute the β links. For the sake of simplicity, the following discussion assumes that switches 210–320 are strictly edge nodes; that is, that they are not included in the backbone ATM network.

FIG. 1 also shows a signaling network 30 that is separate from ATM network 20, e.g., akin to the well-known SS7 signaling network. Signaling network 30 may be employed to signal information between and among the ATM switches and the edge nodes. Accordingly, signaling network 30 is coupled to all of the switches and edge nodes (although for sake of clarity the connections are not shown). Alternatively, the ATM network itself may be used for signaling as well as for communicating the primary information. FIG. 1 further shows a central fabric network interface (CFNI) block 40. It is coupled to the edge nodes of network 20 (although for sake of clarity the connections are not shown), and its function is described in detail below.

It should be noted that edge nodes may be connected to the backbone in a variety of ways:

An edge node may be connected to an ATM switch via a single physical α0 link, such as edge node 270 which is connected to ATM switch 180 via α link 224.

A node can be connected to a single ATM switch via two physically distinct α links, such as edge node 220 which is connected to ATM switch 120 via α links 213 and 214.

More than one edge node can be connected to an ATM switch, such as nodes 210 and 320 which are connected to ATM switch 110 via α links 211 and 212 for edge node 210 and α link 233 for edge node 320.

Conversely, a node can be connected to a plurality of ATM switches, such as edge node 240 which is connected to ATM switches 130 and 170 via α links 217 and 218 to switch 130 and α link 219 to switch 170.

The inclusion of more than one physical α link from an edge node promotes reliability, and that reliability is further enhanced when the physical α links are connected to different ATM switches.

One of the basic notions of a network according to the principles disclosed herein is simplicity of routing and sharing of link capacity. This is achieved by means of Virtual Path Identifier (VPI) routing. The routing follows a routing map for each destination edge node. The routing map encompasses all of the ATM switches—or at least all of the ATM switches to which edge nodes are connected- and, in some embodiments, the edge nodes as well. Actually, a number of slightly different embodiments are readily realizable in connection with the routing map or maps associated with a given edge node being a destination node. In one embodiment, for example, the destination edge node and the ATM switch that homes onto that edge node can be viewed as a unit, allowing the network to view the connection between the destination edge node and the associated ATM switch as one having a single logical path; i.e., there would be a single VPI that defined the path to the destination ATM switch. This would leave the edge node and the ATM switch with the task of allocating traffic among the various physical links between the edge node and the associated ATM switch. For example ATM switch 120 as a destination is equivalent to edge node 220 as a destination. Accordingly, there would be a single routing map for edge node 220 as a destination. In the case of edge node 240, however, there would be two routing maps: one that would home onto ATM switch 130, and one that would home onto ATM switch 170. For situations where more than one edge node is coupled to an ATM switch, that would require the destination ATM switch to extend calls to the different edge nodes based on the virtual circuit identifier (VCI).

In another embodiment, a different VPI may be used for each edge node, but the specific link that is used by the ATM switch that is coupled to the edge node is left to the discretion of the ATM switch and the associated edge node.

In still another embodiment, the VPI to a particular node also specifies the a link that is used from the ATM switch to the edge node. Thus, a path is constructed from an α link and a VPI selected by the transmitting edge node. The α link specifies the link that is used to enter the backbone network, and the VPI specifies the complete path to the destination edge node. The link can be selected a priority, or can be selected dynamically, based on load, priority order, etc. It is this approach that is employed in the illustrations presented below. To establish a connection path, an edge node consults its own database to determine whether a path exists that has available capacity. When such a path exists, it is chosen by selecting a VPI, and the routing is set up according to the selected VPI. Advantageously, the set of paths that comprise the routing map is as disjoint and as short as possible.

In order to simplify the routing tables illustrated herein, the following discussion employs the approach where transmitting edge nodes select an outgoing link and a VPI, and manage the paths. To do that, each edge node is kept informed of the status of the α and β links in the network, and what links are involved in each VPI. By comparison, the ATM switches are dumb. All that they need to know is where to route signals that carry a particular VPI designation.

Figure 2:
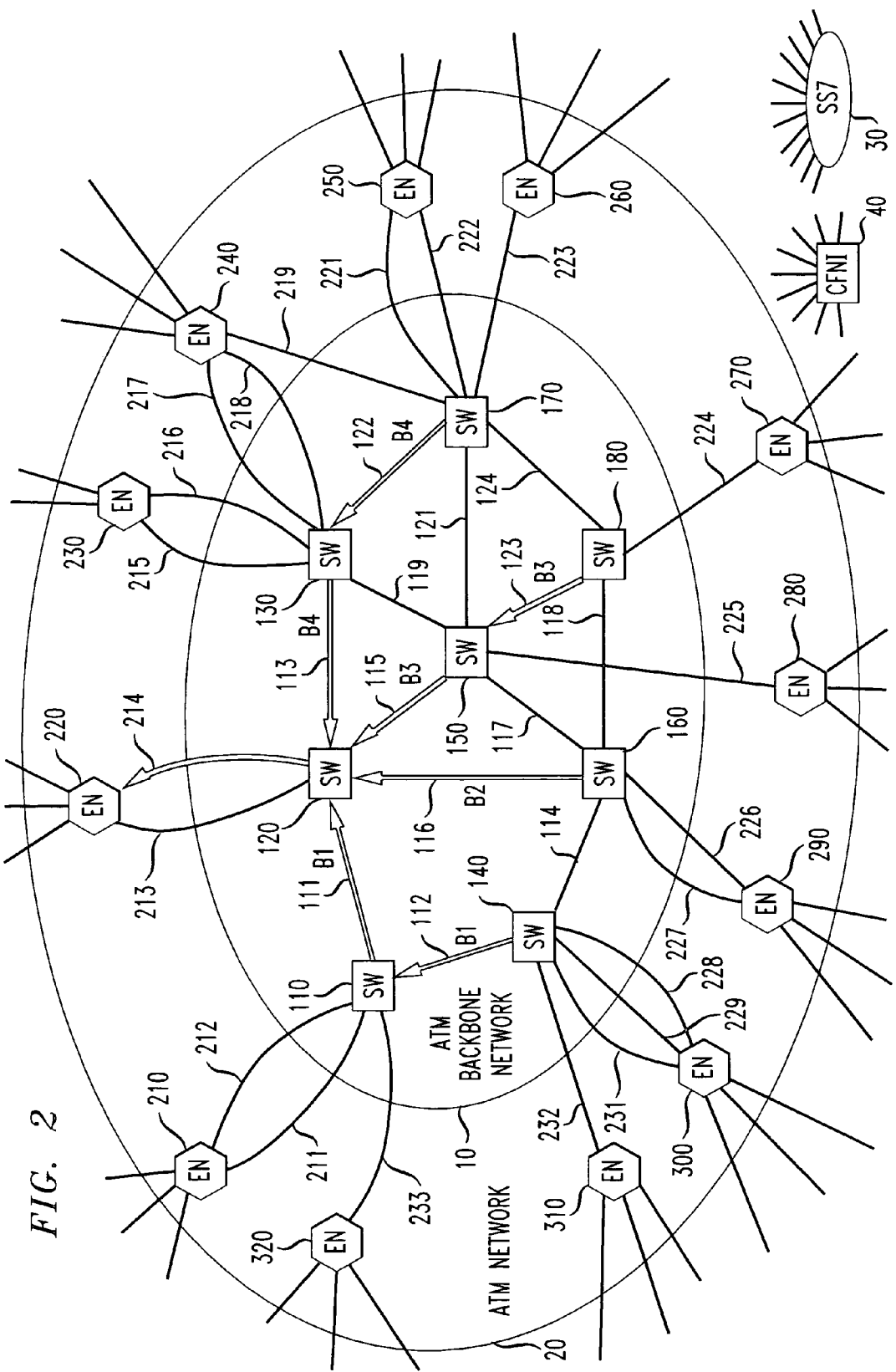
FIG. 2 illustrates a routing map for edge node 220 of the FIG. 1 network, in accordance with various exemplary embodiments of the present invention.
Figure 3:
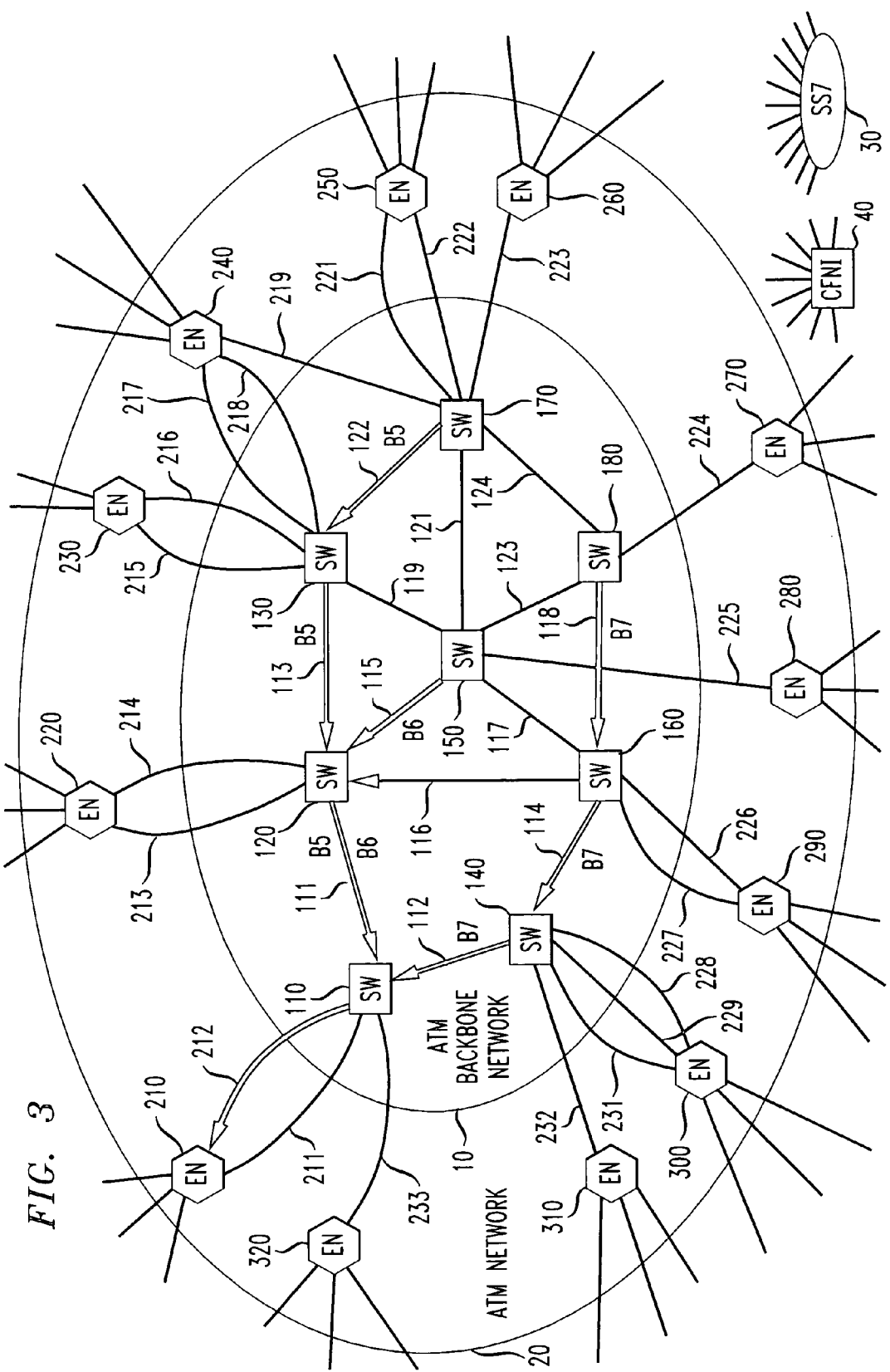
FIG. 3 illustrates a routing map for edge node 210 of the FIG. 1 network, in accordance with various exemplary embodiments of the present invention.
Figure 4:
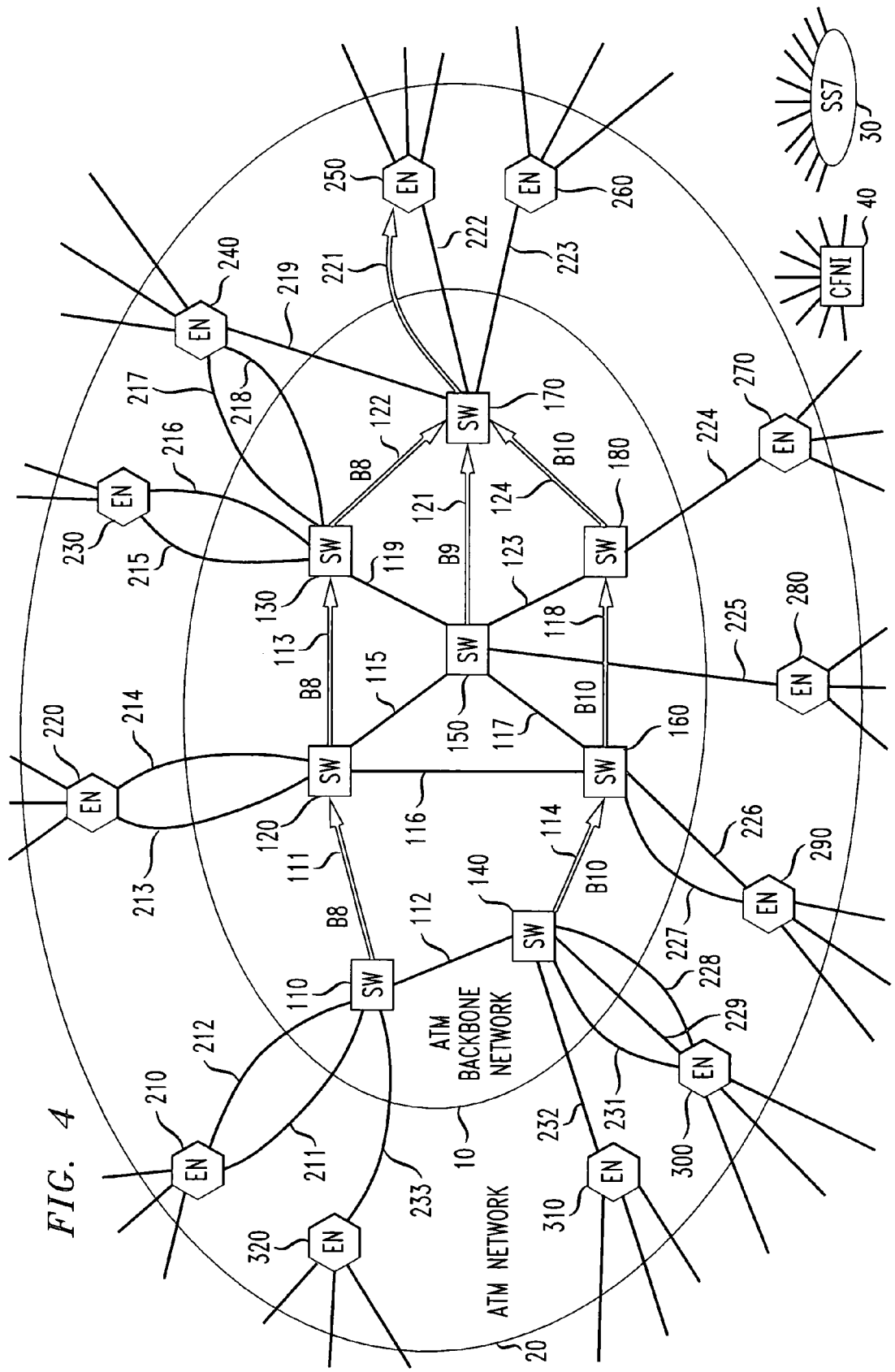
FIG. 4 illustrates a routing map for edge node 250 of the FIG. 1 network, in accordance with various exemplary embodiments of the present invention.

FIG. 2 presents an illustrative routing map for edge node 220 as a destination node; FIG. 3 illustrates a routing map for edge node 210 as a destination node; and FIG. 4 illustrates a routing map for edge node 250 as the destination node. FIGS. 2–4 represent the same network shown in FIG. 1. It may be noted that FIGS. 2, 3 and 4 employ a links 214, 212, and 221, respectively. It is reasonable to expect that a system designer would likely create another set of maps for edge nodes 220, 210 and 250 and those maps would utilize the other a links (213, 211, and 222), as well as another arrangement of paths through network 10. Such other arrangement of paths offers diversity, which increases reliability. For sake of simplicity, however, only the set of maps presented in FIGS. 2–4 is considered below.

Thus, in accordance with the illustrative embodiment presented herein, each switch stores a plurality of information sets in the routing table, and each set represents the routing necessary for reaching a particular each edge node as a destination. The table below illustrates the routing table portion within switch 170 for calls destined to edge node 220. Before perusing the table, one might make reference to FIG. 2 and note that there are four β links coupled to switch 120: links 111, 113, 115, and 116. Moreover, it so happens that each of the four links belongs to a different VPI. Link 111 belongs to VPI B 1 (illustrative VPI designation) which comprises links 111 and 112; link 116 belongs to VPI B2, which comprises only link 116; link 115 belongs to VPI B3 which comprises links 115 and 123; and link 113 belongs to VPI B4 which comprises links 113 and 122. With respect to calls arriving at switch 170 that are destined to edge node 220, calls can be directed to edge node 220 via link 122 (VPI path B4); calls can also be directed to link 121 to join VPI path B3; calls can further be directed to link 124 and thereafter link 118 to join VPI path 132; and calls can still further be directed from link 118 to link 114 to join VPI path B1.

Similarly, in connection with FIG. 3, VPI B5 includes links 122, 113, 111, and 212; VPI B6 includes links 115, 111, and 212; and VPI B7 includes links 114, 112, and 212. In connection with FIG. 4, VPI 8 includes links 111, 113, 122, and 222; VPI B9 includes links 121 and 222; and VPI 10 includes links 114, 118, 124, and 222.

Accordingly, for calls destined for edge node 220, switch 170, for example, would include the entries shown in routing Table I below.

TABLE I (Routing table for edge node 220 being the destination node)

| Input Link | Input VPI | Output Link | Output VPI |
|---|---|---|---|
| 121 | B4 | 122 | B4 |
| 121 | B2 | 124 | B2 |
| 121 | B1 | 124 | B1 |
| 122 | B3 | 121 | B3 |
| 122 | B2 | 124 | B2 |
| 122 | B1 | 124 | B1 |
| 124 | B4 | 122 | B4 |
| 219 or 221 or 22 or 223 | B1 | 124 | B1 |
| 219 or 221 or 22 or 223 | B2 | 124 | B2 |
| 219 or 221 or 22 or 223 | B3 | 121 | B3 |
| 219 or 221 or 22 or 223 | B4 | 122 | B4 |

It may be noted that although each one of the last four entries should really be presented as four separate line entries, the number of entries in Table I is still comfortably low. On the other hand, it should be also remembered that the complete routing table includes eleven more sets like the one shown in Table I above: one for each of the other edge nodes in the FIG. 1 arrangement.

In a typical ATM implementation, VPIs change along a path and are not shared by different paths. In the arrangement disclosed herein, however, the VPIs typically need not change along the path.

Although it simplifies the discussion as well as the operation of the network, it is not critical that the VPIs remain unchanged at each node. What is more important is the ability to fully share capacity over a link and to maintain the identity of paths for capacity management purposes. (In fact, changing VPIs might be useful in sharing voice and data over the same network or in scaling to larger networks.)

Since these routing tables are static and contain no call state information, building reliable redundant switches is greatly simplified. A backup switch that would have the routing table stored in it could instantly be cut-in as a replacement and handle cells delivered to it during an outage.

As an aside, conventionally the ATM cell is 53 octets long and it has a header of 5 octets. Using NNI (Network—Network Interface) addressing, there are 12 bits available for the VPI and 16 bits available for the VCI. This results in 4096 possible VPIs and 65,536 possible VCIs. In accordance with the principles of this disclosure, the destination path is in the VPI field, and the destination call ID is in the VCI field. The VCI is not used in routing. It is only examined by the destination edge node to determine the call identity for proper handling of the cell. The interface to the edge node may be a synchronous trunk, in which case the VCI indicates the particular trunk to be used.

Figure 5:
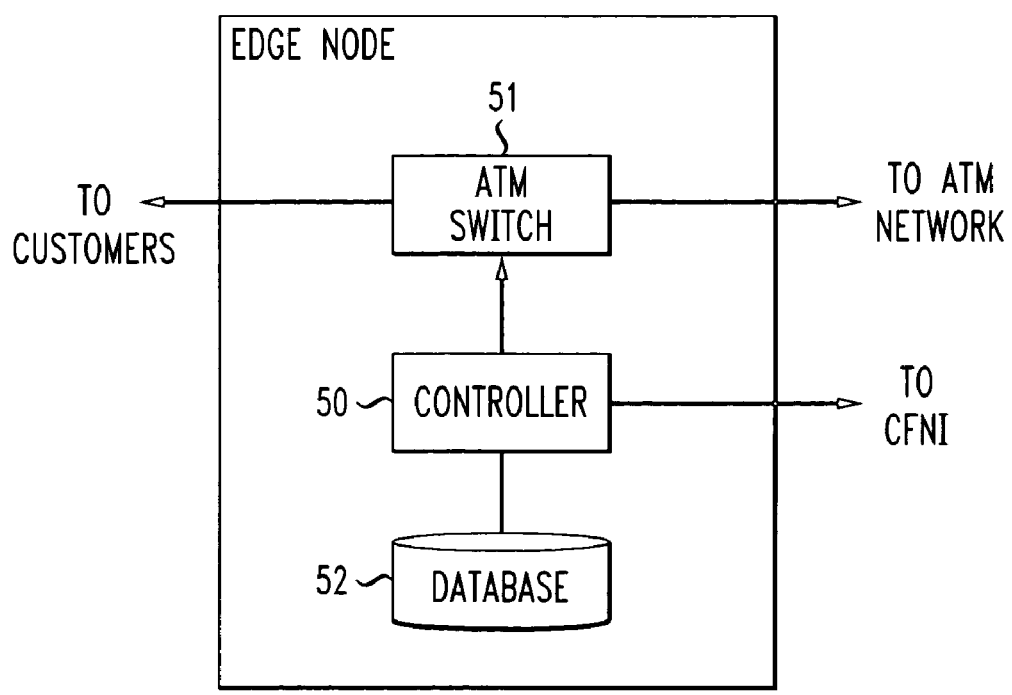
FIG. 5 presents an exemplary block diagram of a processor arrangement within edge nodes that implements the route set-ups for the FIG. 1 network.

As may be already surmised from the above, much of the control over utilization of the network's capacity is carried out at the edge nodes; i.e., outside the ATM backbone network. It is assisted by signaling network 30 (when one is used). To carry out the control (and other functions), each edge node includes a processor arrangement such as depicted in FIG. 5. That is, an edge node comprises an ATM switch 51, a controller 50 and a database 52. Database 52 maintains a record of the α and β links provisioning and the traffic on those links. It might be pointed out that the hardware of FIG. 5 may be incorporated within the processing capabilities that are now available in the hardware that is currently used for edge nodes. On the other hand, the hardware of FIG. 5 may be a separate adjunct that is connected to the edge nodes.

The following illustrates one embodiment for the tables that database 52 may contain. In accordance with this embodiment, database 52 contains Table II which specifies the VPIs that are available for reaching a given destination node, Table III which specifies the links involved in each VPI, Table N which maintains information about the active calls initiated by the edge node, Table V which maintains current information about the contribution by the edge node to the overall traffic in the network; and Table VI which maintains the status of the α and β links. The following illustrates these tables for edge node 270 in the arrangement of FIG. 1. Table II below shows the two sets of VPI information (one for edge node 220 and one for edge node 210). It should be remembered, however, that there are 12 edge nodes and that in an actual implementation there may be more than one set of VPIs for reaching any one edge node.

TABLE II (Destination — VPI table in edge node 270)

| Destination Edge Node | VPI | Destination Edge Node | VPI |
|---|---|---|---|
| 220 | B4 | 210 | B5 |
| 220 | B3 | 210 | B6 |
| 220 | B2 | 210 | B7 |
| 220 | B1 | 250 | B8 |
|  |  | 250 | B9 |
|  |  | 250 | B10 |

Table III below provides the link specification for the 10 VPIs discussed above. It may be noteworthy that the links involved in a particular VPI differ for different edge nodes.

TABLE III (VPI-Link specification in edge node 270)

| VPI | Links | VPI | Links |
|---|---|---|---|
| B1 | 118, 114, 112, 111, 214 | B6 | 123, 115, 111, 212 |
| B2 | 118, 116, 214 | B7 | 118, 114, 112, 212 |
| B3 | 123, 115, 214 | B8 | 123, 119, 122, 221 |
| B4 | 124, 122, 113, 214 | B9 | 123, 121, 221 |
| B5 | 124, 122, 113, 111, 212 | B10 | 124, 221 |

Table IV maintains the information about the outgoing call legs of edge node 270. This information allows ready access for information about the contribution by edge node 270 to the traffic on the different links in network 20. This information can be computed as needed, or it can be kept in a table and updated as existing call paths are dismantled and new calls are established. Table IV, below illustrates a possible set of outgoing calls supported by edge node 270, and Table V, lists the contribution of traffic by edge node 270 to the different links that are involved in the calls identified in Table IV.

TABLE IV (Active Calls initiated by edge node 270)

| VCI | Bandwidth | Destination edge node | VPI used | a link used |
|---|---|---|---|---|
| V101 | 0.412 | 210 | B7 | 224 |
| V267 | 0.525 | 220 | B3 | 224 |
| V321 | 0.505 | 220 | B2 | 224 |
| V120 | 0.212 | 250 | B10 | 224 |
| V098 | 0.750 | 250 | B9 | 224 |

TABLE V (Traffic Contribution by edge node 270)

| Link | 118 | 114 | 112 | 212 | 123 | 115 | 214 |
|---|---|---|---|---|---|---|---|
| Traffic | .917 | .412 | .412 | .412 | .525 | .525 | .525 |
| Link | 116 | 214 | 124 | 221 | 123 | 121 | 224 |
| Traffic | .505 | .505 | .212 | .962 | .750 | .750 | 2.404 |

TABLE VI (Link Status)

| Link | Status | Link | Status | Link | Status |
|---|---|---|---|---|---|
| 111 | 0 | 116 | 0 | 213 | 0 |
| 112 | 0 | 117 | 1 | 214 | 0 |
| 113 | 1 | 118 | 2 | 215 | 0 |
| 114 | 0 | 119 | 0 | 216 | 0 |
| 115 | 0 | 121 | 1 | 217 | 1 |

The information contained in Tables I, II, and III is static. Of course, the information is Tables IV and V is not, for it reflects the outgoing call activity of the edge node. The information in table VI is also not static, but it differs in nature from the information of Tables N and V in that the source of the information is outside the edge node; that is, the source is CFNI 4.0.

More specifically, each edge node is aware of the traffic that it contributes to the network. It is also aware of all outgoing and incoming traffic on its α links; but that information need not necessarily be directly utilized. The important fact to note is that an edge node does not, by itself, know the traffic level on the various a links of the other edge nodes and on the β links of network 10. That's where CFNI 40 comes in. Each edge node communicates to CFNI 40, on a regular basis, the information of table V. CFNI 40 needs to only combine the information provided by the various edge nodes sum the traffic, compare the traffic on each link to the capacity of that link and make a determination whether the capacity can support additional traffic, giving the link the "green" status 0; or that the capacity is considerably used up, giving the link an "orange" cautionary status 1; or that the capacity is close to being used up, giving the link a "red" stop status 2. This status information is communicated by CFNI 40 back to the different nodes and those nodes populate Table VI with this data. As an aside, there can be more than three status states, each corresponding to a selected threshold and each having a different preselected effect.

Armed with a routing Tables I–VI, an edge node can handle set-up requests quite easily. For example, a call originating in edge node 270 may be assigned a circuit ID, say Caaa, and a bandwidth requirement for that circuit may be determined to be, say, 384 kbps. Next, the destination edge node is ascertained, and that may be edge node 220. The ascertaining of the destination edge node may be carried out by the call processing logic in controller 50 associated with edge node 270. The controller then checks whether sufficient capacity is available on one of several pre-provisioned routes. With reference to Table II, the controller determines that the routes corresponding to VPIs B1, B2, B3 and B4 are so pre-provisioned. A reference to Table III identifies the links that would be employed in the course of using one of the identified VPIs, and a review of Table VI tells whether use of any of the VPIs should be avoided because of an "orange" status on one or more of the links designated for that VPI. When such look-ups are made for the illustrated Tables, it is determined that line 118 has an "orange" status and therefore it is wiser to select VPI B3. Knowing that a call to edge node 220 can be established, edge node 270 signals edge node 220 that it wants to set up a call on circuit ID Caaa. This signaling could be done either out of band, using signaling network 30, or the signaling messages themselves could be made to travel through the ATM backbone network. Edge node 220, upon receiving the signaling message, checks for available capacity on one of several pre-provisioned paths in the reverse direction, say a VPI B33 (which corresponds to a path that includes links 213, 116, 118, and 224), assigns a circuit ID Cbbb to this connection, and signals back to edge node 270, passing to it the circuit "Cbbb" designation. At this point, edge node 220 sends ATM cells that carry identifiers VPI B33 (not identified as such in any of the drawings) and VCI Caaa, and edge node 270 sends ATM cells with identifiers VPI B3 and VCI Cbbb.

The small size of the tables in each edge node that maintains information about the traffic contributed to the network by that edge node makes frequent updates and fast routing decisions easier to implement. The computation and control functionality that has been described above can be placed either in the edge node or in a closely linked adjunct. The CFNI functionality can reside in a specially designated edge node, a network database such as a signal control point (SCP), or a stand-alone network element. The CFNI can be replicated for reliability, and it can also be implemented in a distributed manner.

A modification of this routing scheme would allow each edge node to reserve a certain amount of capacity on each β link with only the unreserved capacity available to all paths. This would allow some degree of service protection to each edge node as well as improving the stability of the network under overloads.

The arrangement disclosed herein is robust to network outages as well as congestion. If a link or node should fail, then affected paths could be marked "black" (congestion status 2, for example) and no new call would be routed to them. The algorithm described above could be used to balance the loads across the remaining routes. Calls in progress, which are normally lost at the time of a network failure, could be re-routed in real time to alternate paths.

The above disclosed the principles of our invention by way of illustrative embodiments. Various modifications are of course possible which are included within the spirit and scope of this disclosure. For example, whereas the above disclosure employs the CFNI to ensure that all edge nodes have the information that is necessary for intelligently setting up routes, it should be clear to skilled artisans that it is the end result that is significant, and not the manner of implementation. Thus, for example, the information that each edge node sends to the CFNI could be broadcast to all of the edge nodes through the SS7 network or through the ATM network itself.

Routine Status Database

A second group of embodiments describes a routing status database (RSD), and a method of using the routing status database in conjunction with the DVP routing mechanism of the first group of embodiments.

The RSD is adapted to perform out-of-network routing, class-of-service and capacity management in a packet transport network. Contrary to current trends, the RSD performs these functions in a logically centralized manner. The CFNI described in the first group of embodiments is an example of a RSD.

The Routing Status Database (RSD) is a centralized network database which contains routing information for a packet network. The RSD contains network routing information as well as the current status of the routes in the network. The route status information in the RSD may be updated in a variety of ways, including real-time updates as routes are selected, periodic updates from switches, and updates from switches when certain thresholds are reached. The information in the RSD may be accessed in a variety of ways by edge nodes routing calls. These include accessing the RSD on a per-call basis, and using default routes for a particular destination, where the default route may be changed from time to time by the RSD to reflect changing network conditions.

The RSD may be used in conjunction with a number of other innovations. For example, the RSD may be used in conjunction with a service control point (SCP) of an Intelligent network. An SCP determines an appropriate destination for a call having more than one possible destination, such as a call to the 800 number of a large customer that may be routed to one of a number of regional service centers, based on factors such as the availability of representatives in the various service centers. The RSD may be accessed after an SCP or at the same time as an SCP, and the same server may provide RSD and SCP functionality.

Centralized routing is contrary to the current networking trends, due to the large size of the databases required for most existing network topologies. However, the sparse network topology of a network using the routing mechanism of the first group of embodiments makes frequent database updates and fast routing decisions easier to implement, and is well suited for a centralized routing scheme. For example, a nationwide backbone network might have 20–30 backbone nodes interconnected by a total of 30–45 β-links, and 100 edge nodes with 2 α-links each, such that there are less than 300 links in the network.

Centralized routing provides numerous advantages for network providers:

A logically centralized network controller can be used to achieve dynamic, real-time routing, without incurring the long call setup delays associated with decentralized hop-by-hop routing protocols. In particular, many decentralized schemes utilize crankback, which routes a call back to the source to try an alternate route if the chosen path is congested. Crankback adds delay to the affected calls, and can also aggravate network congestion due to the additional retry load. Additionally, crankback may be difficult to use in a switch with a distributed architecture. The crankback would return to the originating switch interface. In order to find an alternate route, a different switch interface may need to be used. "Transferring" the call to a different interface, may be quite difficult, or even impossible.

Centralization is an effective way to provide different grades of service to calls of varying priority on an end-to-end basis. Grade of service schemes can be enforced early in the call flow and across multiple network resources such as real-time and bandwidth.

Basic quality-of-service guarantees and differential grades-of-service can be provided for connectionless packet networks.

In an ATM transport environment, Virtual Path restoration can be provided by the logically centralized network controller. The failed path can be associated with a "failed" network state, and new calls can be routed on a pre-determined alternate path.

Centralization avoids interworking problems associated with operating in a multiple vendor environment.

Centralization allows network providers to purchase "commodity" low functionality switches (and avoid costly custom development), and at the same time to develop proprietary routing algorithms to maintain a competitive advantage.

Centralization eases the routing provisioning burden of large networks, since routing data structures are maintained in a single location, rather than being distributed and replicated throughout the network.

The RSD of the present invention is "centralized" in a logical sense, i.e., when routing a call, each edge node has access to the same information from the routing status database as the other edge nodes, or at least the relevant subset thereof. The physical implementation of the RSD can range from a single centralized server, to partitioned, to replicated. Each edge node is logically connected to the RSD, i.e., each edge node is able to communicate with the RSD in order to obtain information that can be used to route calls.

Architectures

The RSD of the present invention includes the CFNI of the first group of embodiments, as well as a number of other architectures. The particular architecture is preferably chosen based on the particular environment in which it will be used.

Figure 6:
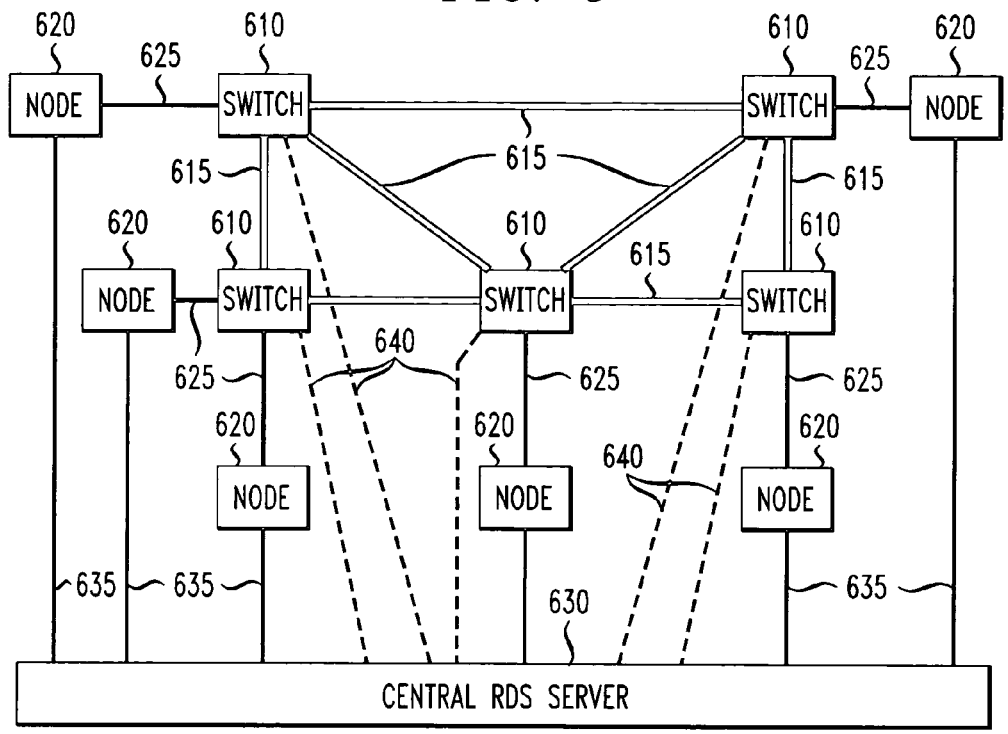
FIG. 6 shows an exemplary network architecture having a central routing status database in which various exemplary embodiments of the present invention may be practiced.

FIG. 6 shows a network architecture in which the first group of embodiments maybe practiced. A plurality of backbone ATM switches 610 are interconnected by a plurality of β-links 615. A plurality of edge nodes 620 are each connected to at least one backbone ATM switch 610 by at least one α-link 625. Each edge node 620 may contain a fabric network interface (FNI), partitioned from the rest of edge node 620, that keeps track of the amount of bandwidth used by every call that originates at its edge node 620, on every α-link 625 and every β-link 615. FNIs are not required, and their functionality may be subsumed by the rest of edge node 620. A central RSD server (CRSDS) 630 is connected to each edge node 620, by links 635. The CFNI of the first group of embodiments in an example of a CRSDS. Links 635 may be separate from the α and β links, as shown in FIG. 6. For example, CRSDS 630 may be a part of a signaling network separate from the load bearing network, as is known to the art. The well known SS7 network is an example of such a separate network. Alternatively, the connections between CRSDS 630 and edge nodes 620 may include α and/or β links that replace all or a part of links 635. Optionally, backbone ATM switches 610 may be connected to CRSDS 630 by links 640. Links 640 are not necessary for some embodiments of the present invention, because edge nodes 620 are able, in the aggregate, to provide complete information about the congestion status of every α-link 625 and every β link 615.

In a first of the second group of embodiments, which uses the architecture of FIG. 6 to implement the first group of embodiments, each FNI tracks the amount of bandwidth used on each α-link and β-link in the network by calls originating at its edge node 620, and periodically transmits this information to CRSDS 630. CRSDS 630 uses this information to calculate the total bandwidth used on each slink and each β-link. These totals are then passed to edge nodes 620, which use them to calculate the status of pre-determined routes through the network. This status is then used to select which route to use for new calls. Note that each edge node 620 need only derive the status of those pre-determined routes that originate at the particular edge node. The "RSD" in this situation is distributed, and includes the FNIs, CRSDS 630, and links 635.

The architecture of FIG. 6 may also be used in different ways. In a second of the second group of embodiments, edge nodes 620 may track the amount of bandwidth used on each α-link and β-link in the network by calls originating at its edge node 620, and periodically transmit this information to CRSDS 630. CRSDS 630 may then use this information to calculate the total bandwidth used on each α-link and each β-link, and derive the status of pre-determined routes through the network. Edge nodes 620 query CRSDS 630 when a new call is originated, and provides CRSDS 630 with the origin and destination of the call. CRSDS 630 decides how to route the call, based on the status of the pre-determined routes, preferably selecting the least congested of the predetermined routes for the origin destination pair, and communicates this decision to the querying edge node 620, which then routes the call. The "RSD" in this second embodiment is more centralized than in the first.

In a third of the second group of embodiments, each edge node 620 tracks the amount of bandwidth used on α-links connected to the edge node 620, regardless of the origin of the call, and periodically transmits this information to CRSDS 630. Each backbone ATM switch 610 tracks the amount of bandwidth used on β-links connected to the backbone ATM switch 610, and periodically transmits this information to CRSDS 630. Note that there is some redundancy in the reporting of the status of β-links, which may be reduced or eliminated by having each backbone ATM switch 610 track and report the status of only selected connected β-links. CRSDS 630 may then use this information to derive the status of pre-determined routes through the network for use in routing decisions.

Figure 7:
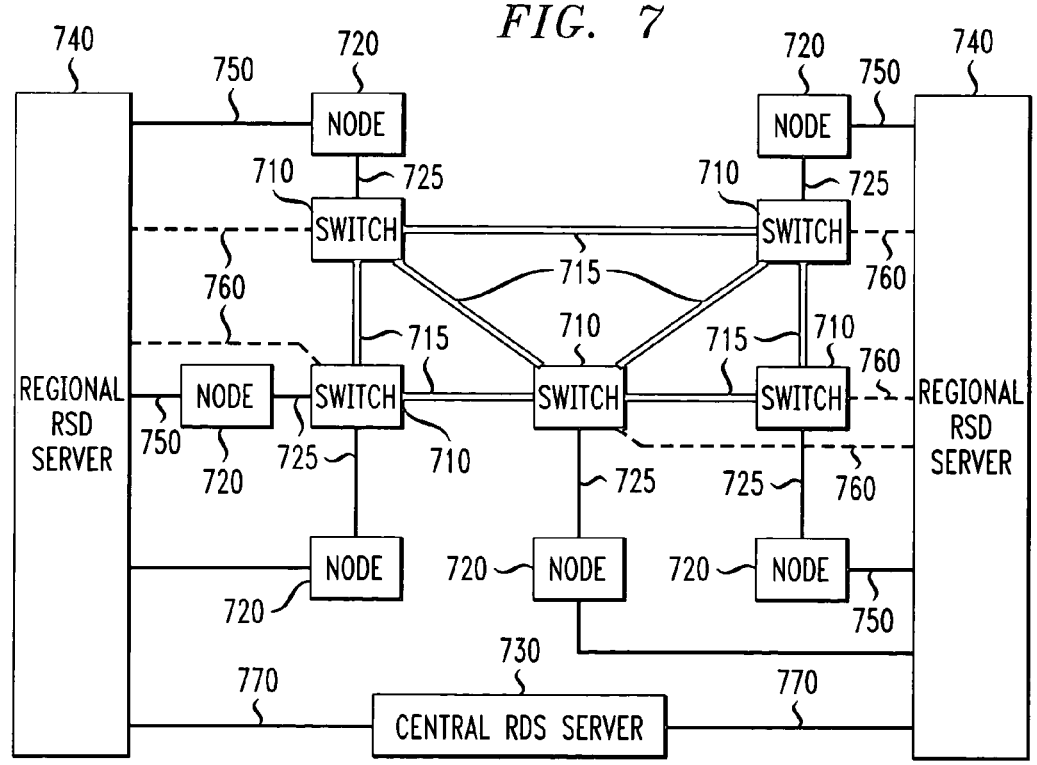
FIG. 7 shows an exemplary network architecture having regional routing status databases in which various exemplary embodiments of the present invention may be practiced.

FIG. 7 shows an architecture similar to that of FIG. 6, but incorporating regional RSDSs (RRSDSs). Backbone ATM switches 710, β-links 715, edge nodes 720, and α-links 725 are analogous to backbone ATM switches 610, β-links 615, edge nodes 620, and α-links 625 of FIG. 6. Each edge node 720 is connected to one of a plurality of RRSDSs 740 by a link 750. Optionally, each backbone ATM switch 710 is connected to an RRSDS by a link 760. Each RRSDS is connected to a CRSDS 730 by a link 770.

The architecture of FIG. 7 may be used in ways similar to that of FIG. 6. However, edge nodes 720 and optionally backbone ATM nodes 710 track information regarding bandwidth usage, and transmit this information to RRSDSs 740. RRSDSs forward the information to CRSDS 730, preferably aggregating the information before forwarding. For example, a particular RRSDS 740 may receive information from several edge nodes 720 regarding the amount of bandwidth that each of the edge nodes uses on a particular β-link 715. RRSDS 740 may aggregate this information into a single piece of information that represents the total bandwidth used on the particular β-link by those edge nodes 720 that are connected to the particular RRSDS 740. CRSDS 730 receives information from each RRSDS 740, and uses this information to compute the total bandwidth usage on each α-link and each β-link.

In a fourth of the second group of embodiments, the usage information is then preferably distributed to the RRSDSs 740, where it is used to compute route congestion status. Preferably, each RRSDS 740 only computes route congestion status for those routes that originate at edge nodes 720 that are connected to the particular RRSDS 740. Edge nodes query the RRSDS to which they are connected to establish how a call should be routed. The fourth of the second group of embodiments is similar to the second of the second group of embodiments. However, there are several RRSDSs 740 that respond to queries from edge nodes 720, instead of a single CRSDS. The fourth embodiment advantageously distributes the burden of responding to such queries, reducing the burden on CRSDS 730, and also reducing bandwidth usage in the network used to carry the queries by reducing the average distance that a query must travel.

The architecture of FIG. 7 may also be used in other ways, similar to those described for the architecture of FIG. 6. For example, the calculation of route congestion status may occur at CRSDS 730, RRSDSs 740, or edge nodes 720. Edge nodes 720 may send a query to an RRSDS 740 to determine how to route a new call, or route congestion databases may be maintained at each edge node 720. The total bandwidth usage on each α-link and β-link may be calculated based on reports of contributions from each edge node, or may be measured directly by an edge node 720 and/or backbone ATM switch 710 to which the link in question is connected.

Routine Status Database Content

For each (source, destination) pair in the network, the RSD contains some or all of the following information. Depending on the needs and size of the network, a "destination" could be a terminating switch or it could be a trunk group or virtual path.

Connectivity information regarding the set of routes that can be used to interconnect the source and destination.
Information about alternate routes.
Information on the capacity of each route in the network.
Status of all of the routes in the network.
Status could be in the form of free or available capacity or utilization on each link, or could be a status indicator such as "lightly loaded", "heavily loaded", "extreme congestion".
The data needed to manage routing features responsible for distributing load to multiple physical destinations based on some rule or logic.

Tables VII–IX show a sample RSD for the network of FIGS. 1–5. The Tables show information for only a limited number of routes, whereas a real RSD would have more complete information. In particular, if there are k routes between each pair of edge nodes and n edge nodes in the network, the total number of rows in the Route Status Table (Table IX) is kn(n−1)/2. The α-link, β-link, source, destination, and VPI numbers of Tables VII–IX refer to the reference numbers of FIGS. 1–5.

Table VII contains the current usage of each α-link. Table VII also contains two congestion thresholds for each link, which define three congestion status ranges—referred to as "green," "yellow," and "red," in increasing order of congestion. A status of "green" may mean that the route has plenty of capacity left and that new calls can be routed there with no difficulty. A status of "yellow" may mean that the link is beginning to get congested and that alternate routes should be used if available. A status of "red" may mean to avoid using the route if at all possible. For example, if a call arrives and all its possible paths are "red," the call may be blocked, depending upon its priority. For example, α-link 214 has a "green" congestion status when the usage is not greater than 1.4 Gbps, a "yellow" congestion status when the usage is greater than 1.4 Gbps and not greater than 1.8 Gbps, and a "red" congestion status when the usage is greater than 1.8 Gbps. The current usage of α-link 214 is 1.312 Gbps, so the congestion status is "green." The current usage and congestion status of each link are periodically updated. It may be desirable to define different congestion thresholds for different links, due to factors such as different capacities and different expected usage volumes. In addition, it is preferable to incorporate a safety margin of additional capacity into the thresholds, because there is some potential for the information in the RSD to be slightly inaccurate or outdated. While Table VII only shows 2 congestion thresholds that define 3 congestion status for each link, many more thresholds and congestion status may be defined to allow for load balancing, overload control, and priorities for different quality-of-service traffic.

Table VIII gives the status of the β-links in the network. The information in Table VIU is similar to that in Table VII, but applies to β-links instead of α-links.

Table IX gives the Route Status Table. The α-links and β-links associated with each route are identified, and the congestion status for each route is maintained. The congestion status can be periodically updated from the individual link congestion status information in Tables VII and VIII. There are many possible methods for defining Route Status based on Link Status. Route Status could be defined as equal to the status on the most congested link in the route, or as an average of the congestion status values for each link in the route. Many other definitions are possible, and the present invention is not intended to be limited to any particular set of definitions. The Route Status values in Table IX are based on using the status of most congested link on the route from Tables VII and VIII.

TABLE VII

α-link Status Table

| α-link | Current Usage (Gbps) | Thresholds (Gbps) | Status |
|---|---|---|---|
| 214 | 1.312 | 1.4, 1.8 | Green |
| 221 | 2.130 | 1.8, 2.2 | Yellow |
| 224 | 1.243 | 1.4, 1.8 | Green |
| ... | ... | ... | ... |

TABLE VIII

•-link Status Table

| β-link | Current Usage (Gbps) | Thresholds (Gbps) | Status |
|---|---|---|---|
| 115 | 1.830 | 1.8, 2.2 | Yellow |
| 116 | 1.240 | 1.8, 2.2 | Green |
| 118 | 1.356 | 1.4, 1.8 | Green |
| 121 | 2.314 | 1.8, 2.2 | Red |
| 123 | 1.927 | 1.8, 2.2 | Yellow |
| 124 | 1.190 | 1.8, 2.2 | Green |
| ... | ... | ... | ... |

TABLE IX

Route Status Table

| Origin | Destination | VPI | α-links | β-links | Status |
|---|---|---|---|---|---|
| 270 | 220 | B2 | 224, 214 | 118, 116 | Green |
| 270 | 220 | B3 | 224, 214 | 123, 115 | Yellow |
| 270 | 250 | B9 | 224, 221 | 123, 121 | Red |
| 270 | 250 | B10 | 224, 221 | 124 | Yellow |
| ... | ... | ... | ... | ... | ... |

Updating the Routing Status Database

There are several different methods that may be used to update the information in the RSD. Representative methods include:

Method 1. The RSD maintains a count of calls in progress and/or total bandwidth along each route. The count for a particular route is incremented when the RSD selects that route for a call, and is decremented when the call is complete or the call fails. Method 1 may be supplemented with other methods to insure the accuracy of these counts, to correct for inaccuracies caused, for example, by call failures that do not register with the RSD. For example, switches may periodically give the total number or bandwidth of calls in progress to the RSD. This periodic update method would be similar to that of Method 3 described below, but would occur on a less frequent basis—such as every few hours instead of every few minutes. Alternatively, a switch that reaches zero calls in progress on a link, may send a message to the RSD to zero out the appropriate counter. Other variations of these schemes are possible, and are covered by this invention.

Method 2. The RSD maintains a count of calls in progress and/or total bandwidth along each route. The RSD increments the count in a manner similar to that of method 1. The RSD decrements the count by "time-out," i.e., the RSD assumes that a call will last for a predetermined period of time, such as 5 minutes, and decrements the count for a particular call when the period of time, measured from the start of the call, has expired. This decrementing occurs regardless of when the call is actually completed or failed, which may cause some inaccuracy. Method 2 could be used if it is not possible, or uses too many resources, to send a message to the RSD each time a call ends or fails. Other methods may be used to supplement the accuracy of Method 2. For example, a periodic update of the total number of calls or bandwidth, similar to that of Method 3 but performed on a less frequent basis, for example every few hours, may be used. Also, the predetermined period of time may be adjusted based on information obtained from these other methods. For example, if a periodic update using a method similar to Method 3 consistently shows more bandwidth being used than that determined using Method 2, the predetermined period of time may be adjusted slightly upward.

Method 2 may be implemented by having an RSD that keeps track of when each call was initiated, until such time as the call is timed out and the bandwidth attributable to that call is decremented. Alternatively, the RSD could keep track of how much bandwidth was added to the current total usage of each link in each of a number of previous periods of time—for example, for each of the previous five minutes. Using this alternative, the RSD would decrement the total usage due to calls timing out at the end of each period of time—for example, after each minute.

Method 3. Each edge node sends periodic updates to the RSD. This update communicates the current total usage of bandwidth on each α-link and each β-link by calls originating at that edge node. The updates from the switches need not be coordinated, and may arrive at the RSD asynchronously. The RSD periodically aggregates the usages per switch to compute the total usage of each link, based on the most recent update received from each edge node. Link status is determined by comparing the total link usage with the thresholds. Note that the RSD keeps track of the contribution to each link due to traffic originating at each edge node, which may require a database that is larger than that used with Method 1, for example.

Method 3 is somewhat more distributed than Method 1, and probably uses less processing resources. Method 3 is probably less error-prone than Method 1, because bandwidth measurements from the switches are regularly received by the RSD. On the other hand, Method 3 may require some minimal switch development.

Method 4. Edge nodes send updates to RSD based on a relative threshold. Method 4 is a variant of Method 3. Instead of sending updates to the RSD periodically for all links, updates are sent for a given link only when the load contributed to that link by the edge node sending the update differs from the previous load report by more than a predetermined percentage or value.

Method 5. Edge nodes send updates to RSD periodically for β-links, in a manner similar to Method 3. Edge nodes also send updates to the RSD for the slinks connected to the switch based on an absolute threshold, preferably the congestion thresholds of Table VII. The α-link measurements include calls destined for the edge node as well as calls originating at the edge node, i.e., each edge node reports the total bandwidth used on α-links directly connected to that edge node. The edge nodes do not necessarily report bandwidth usage for α-links used by calls originating at the edge node, but separated from the edge node by one or more intervening switches.

Method 6. Other threshold based schemes. This method covers any combination that includes a threshold based update: absolute threshold, relative threshold, periodic updates for any combinations of α-links and β-links.

Method 7. Backbone ATM switches provide β-link status updates. Depending on the network, and the network configuration, the backbone ATM switches can directly update the RSD. α-link status updates could be provided either by the edge node to which they are connected, or the backbone ATM switch to which they are connected. Depending on the capabilities of the backbone ATM switches and the network requirements, these updates could provide information about utilization (number of calls), bandwidth, and/or congestion level. The updates could be provided on a periodic, absolute threshold, or relative threshold basis.

Accessing the Routing Status Database to Route Calls

There are also several methods that may be used to access the information contained in the RSD to route calls. Each of these methods may be used in conjunction with any of the methods used to update the RSD, except as otherwise indicated. Representative methods include:

Method 8. The originating switch queries the RSD for the route to be used by a new call on a per-call basis. Method 8 is described in conjunction with Method 1 of updating the RSD:

A new call arrives at originating switch 270, which determines that the call is destined for switch 220. The (origination, destination) information is passed to the RSD, which contains the information shown in Tables VII–IX. If there are different possible bandwidth requirements for different types of calls, the bandwidth requirement is preferably also passed to the RSD. The RSD uses the information in Table 1× to determine that the best route from switch 220 to switch 270 is B2, with a congestion status of "green." The RSD then increments the current usage and congestion status entries for α-links 224 and 214 in Table VII and β-links 118 and 116 in Table VIII. Several techniques could be used to update the Status Field in Table IX. For example, it could be updated periodically, or upon a change in a congestion status. When the call ends, or does not make a successful connection, switch 220 and/or switch 270 sends another message to the RSD, and the RSD decrements the current usage on the applicable α-links and β-links.

Method 9. The edge nodes use a set of pre-planned or default routes to route new calls, and do not query the RSD for each call. Each edge node has one or more pre-planned routes to each destination in the network. As a first attempt, an edge node attempts to route a new call on the pre-planned route. Where there are multiple routes for a single destination, the route may be chosen on a first choice/alternate route basis, probabilistically, round-robin, or using another scheme. If the preplanned route fails, the edge node queries the RSD.

Method 9 advantageously offers a quicker call setup than Method 8, because the RSD does not have to be queried for each call. However, the pre-planned routes could become nonoptimal, resulting in frequent RSD queries.

Method 10. The switches use a set of pre-planned or default routes, where these routes are periodically updated by the RSD. The RSD uses the congestion status database to determine a new set of default paths for each switch, and transmits this to all of the switches. Method 10 offers the advantages of Method 9, with the additional advantage that the pre-planned route selected is more likely to be optimal, because the selection of route is based in part on information from the RSD. The cost of this additional advantage is the bandwidth consumed by the periodic updates from the RSD. The updates to the defaults may occur on a periodic basis. Alternatively, the updates to the defaults may occur at a time determined by the congestion status of the default routes and available alternate routes. For example, the updates may be triggered by congestion thresholds, i.e., when a previously selected default route becomes more congested than an available alternate route by a certain margin, the RSD may update the edge nodes to use the alternate route by default.

Method 8 of accessing the RSD is preferably used in conjunction a with method of updating the RSD that relies on the RSD receiving information each time a call is initiated, such as Methods 1 and 2, because the per-call query of Method 8 provides such information. Methods 9 and 10 are preferably used in conjunction with methods of updating the RSD that do not necessarily rely on receiving information each time a new call is initiated, such as Methods 3–7, because Methods 9 and 10 do not necessarily query the RSD for each new call.

Class-of-Service

Class-of-service on an end-to-end basis may be implemented using the RSD. Using Method 8, for example, the originating edge node passes a class-of-service indicator to the RSD in addition to the origination and destination information for the call. The RSD uses the Route Status in Table IX to give priority to the more important calls. For example, if the Route Status is Green, any call can use the route. If the status is Yellow, only high priority calls can use the route, and if the status is Red, only the most critical calls can use the route. This example may be generalized to additional congestion status levels. Alternatively, the RSD can route only a fraction of calls of lower priority on more congested routes. For example, if the Route Status is yellow, then a rule might be that 25% of low priority calls and all of the high priority calls can use the route. Algorithms similar to those used in AT&T's Advanced Routing Service (ARS), which uses period status update information to balance the traffic distributed to several groups of call attendants or agents, may be used to balance the load across the possible paths. The ARS is described in U.S. Pat. No. 5,530,744, which is incorporated by reference.

Managing Multiple Routes

The RSD is also ideally suited to manage load to destinations which can be reached by multiple routes. Two main reasons for multiple routes are reliability and the existence of multiple network providers that can be used to reach the destination. For example, there may be two network egress points to a local provider from the long-distance network, as in the AT&T service Split Access Flexible Egress Routing (SAFER). Then if one route fails, the other one can be used to handle the calls without a reliability impact. As another example, there are multiple routes to multiple carriers in foreign countries. The multiple carriers have arisen as the telecommunications industry has deregulated, and the multiple routes are for reliability. Thus, in order to route a call to a destination in country B, first a carrier has to be chosen (either at random or according to a predefined proportion), and gateway switch (typically there are at least 2 for reliability) terminating that carrier has to be chosen. Examples of AT&T service using these capabilities are Carrier Proportional Routing (CPR) and Carrier Specific Routing Preference (CSRT). Historically, the logic used to manage multiple routes to multiple carriers has been distributed in originating switches. This creates a substantial provisioning burden, especially in light of frequently changing parameters. The RSD provides a unique opportunity to centralize this function, substantially lightening the operational burden associated with distributing the function to all originating switches. If this function is placed in the RSD, either a call-by-call query to the RSD or a trigger table of some kind may be used at each edge node to identify which calls need to query the RSD for this specialized routing information.

Virtual Path Restoration

The RSD can effectively implement Virtual Path restoration at the ATM level. If α- or β-links become unavailable, the backbone ATM switches or the edge nodes notify the RSD of the failure, resulting in a link status of "Black" in Table IX. The RSD then routes all new calls, regardless of priority, on one of the other paths.

EXAMPLE

A Call Flow Using the RSD

Figure 8:
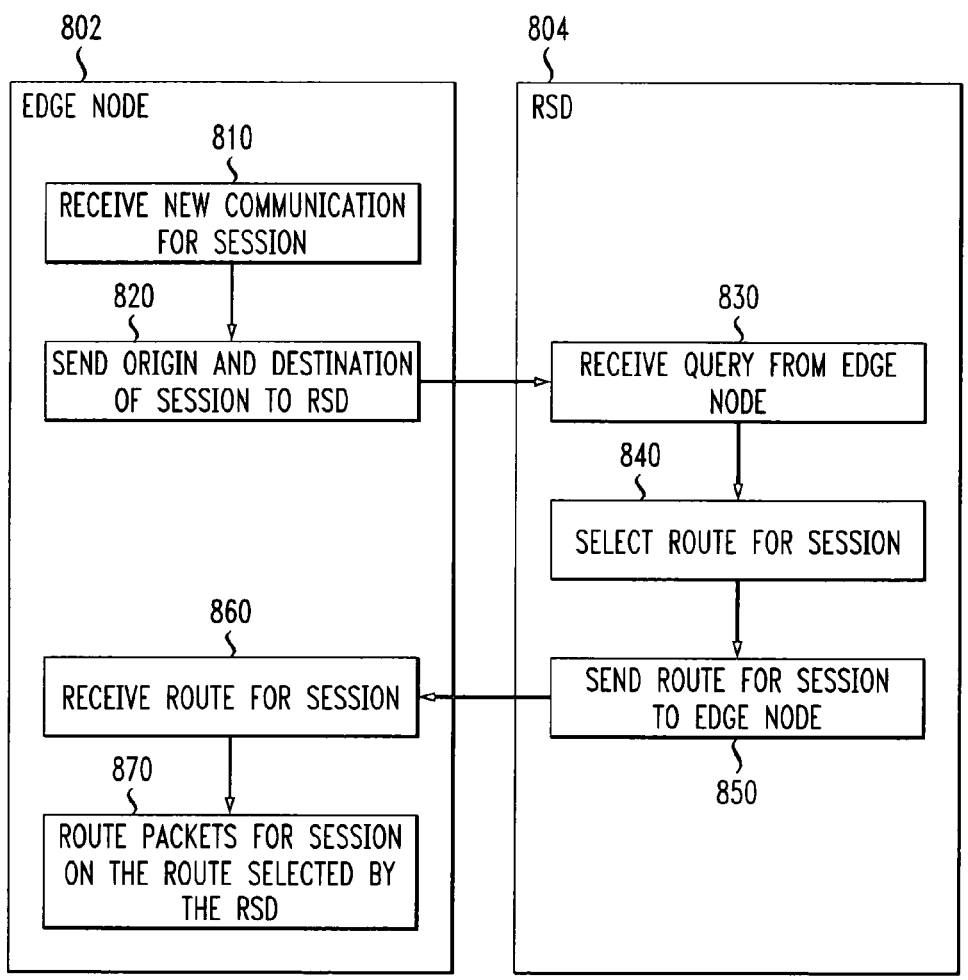
FIG. 8 shows an exemplary call flow that illustrates how an edge node obtains a routing information from a routing status database (RSD)

FIG. 8 shows a call flow between an edge node 802 and an RSD 804 showing how the edge node obtains a VCI for the call from the RSD. For example, edge node 802 is analogous to an edge node 620 of FIG. 6, and RSD 804 is analogous to CRSDS 630 of FIG. 6. The message protocol used for RSD queries might be SS7, or it could be any other data network protocol.

In a first step 810, edge node 802 receives a new call/communication for a session.

In a second step 820, edge node 802 sends source and destination information to RSD 804. Depending on the features supported by RSD 804, edge node 802 may send additional information, such as the priority of the session or the bandwidth required by the call/communication.

In a third step 830, RSD 804 receives the origin and destination information from edge node 802, and any other information sent as well.

In a fourth step 840, RSD 804 selects a route for the session, based on the source and destination information, as well as the congestion status of potential routes. This selection may be made using a method similar to Method 8, 9 or 10, as described above. The priority of the session may also be considered in selecting the route. Using the routing scheme of the first embodiment, the selected route may be uniquely identified by a VPI.

In a fifth step 850, RSD 804 sends the identity of the selected route to edge node 802.

In a sixth step 860, edge node 802 receives the identity of the selected route.

In a seventh step 870, edge node 802 sets up the session on the selected route.

Preferably, the session is set up in accordance with the procedures described in the third group of embodiments.

Signaling Procedures

A third group of embodiments describe signaling procedures that support the routing mechanism of the first and second groups of embodiments.

Figure 9:
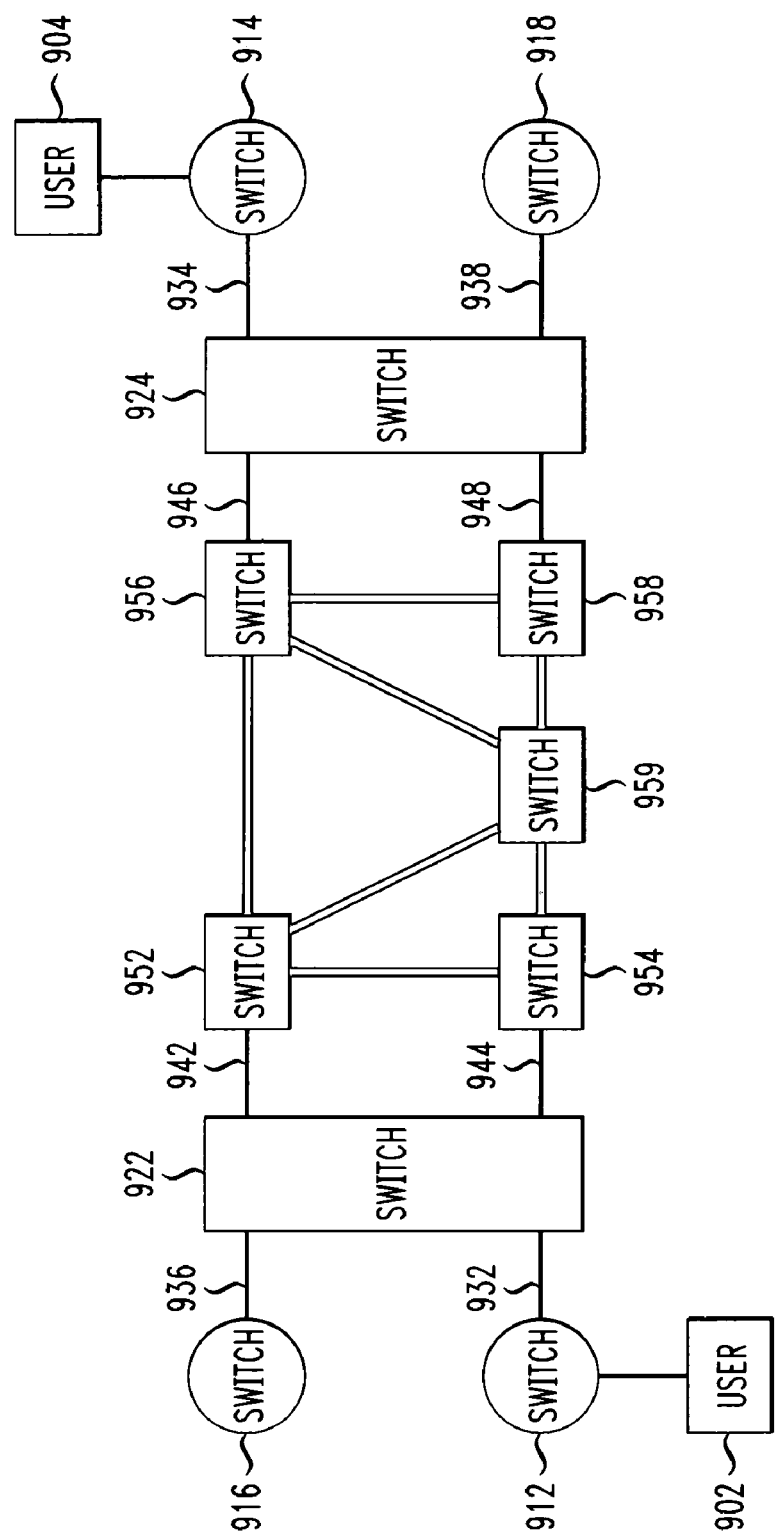
FIG. 9 shows an exemplary network architecture similar to that of FIG. 6, but showing more detail at the local level.

FIG. 9 shows the architecture of a network 900 in which the third group of embodiments may be practiced. In particular, FIG. 9 shows an ATM toll network. The architecture of FIG. 9 is similar to that of FIG. 6, but FIG. 9 shows more detail at the local level, such as users and TDM switches. The RSD is not shown in FIG. 9 for clarity. However, it is understood that the network topology of FIG. 9 is provided for illustrative purposes, and that the present invention is not limited to that topology.

Network 900 includes Time Division Multiplex (TDM) switches 912, 914, 916 and 918, which may be, for example, central offices of a local telephone network. A user 902 is connected to TDM switch 912, and a user 904 is connected to TDM switch 914. Network 900 also includes ATM switches 922 and 924, which are analogous to the edge nodes of FIGS. 1–7. ATM switch 922 is connected to TDM switches 912 and 916 by TDM trunks 932 and 936, respectively. ATM switch 924 is connected to TDM switches 914 and 918 by TDM trunks 934 and 938, respectively. ATM switches 922 and 924 are adapted to terminate TDM trunks 932, 934, 936 and 938 for connectivity to TDM switches, as well as ATM Virtual Path (VP)/Virtual Channel (VC) connections 942, 944, 946 and 948 for connectivity to backbone ATM switches. Network 900 also includes backbone ATM switches 952, 954, 956, 958 and 959, which are analogous to the backbone ATM switches of FIGS. 1–7. Backbone ATM switches 952 through 959 are ATM cross-connects, with unidirectional permanent virtual circuits (PVCs) provisioned between them, in accordance with the first and second group of embodiments. Backbone ATM switches 952 and 954 are connected to ATM switch 922 by connections 942 and 944, respectively, and backbone ATM switches 956 and 958 are connected to ATM switch 924 by connections 946 and 948, respectively. It should be appreciated that the above ATM and TDM switches are nodes of network 900, and that network 900 also has many other switches and connections, which are not shown for clarity. It should also be appreciated that ATM switches 922 and 924 may also be directly connected to users.

The routing techniques of the third group of embodiments is based on the availability of a unidirectional Virtual Path Identifier (VPI) that specifies a unique route from one edge node to another, e.g., from ATM switch 922 to ATM switch 924, in accordance with the first and second groups of embodiments. The third group of embodiments describes how a Virtual Channel (VC) within a VPI may be selected to establish a unidirectional connection between two edge nodes, and also between two users served by their respective edge nodes. The third group of embodiments also describes how two unidirectional connections between two edge nodes may be established, to establish a two-way communication between the edge nodes. The third group of embodiments relies on the communication of signaling messages between the edge nodes. These signaling messages may be communicated using signaling networks and protocols known to the art. While some modifications to the standard protocols, such as PNNI and B-ISUP, may be required to practice the third group of embodiments, these modifications will be apparent to one of skill in the art from the following description.

Figure 10:
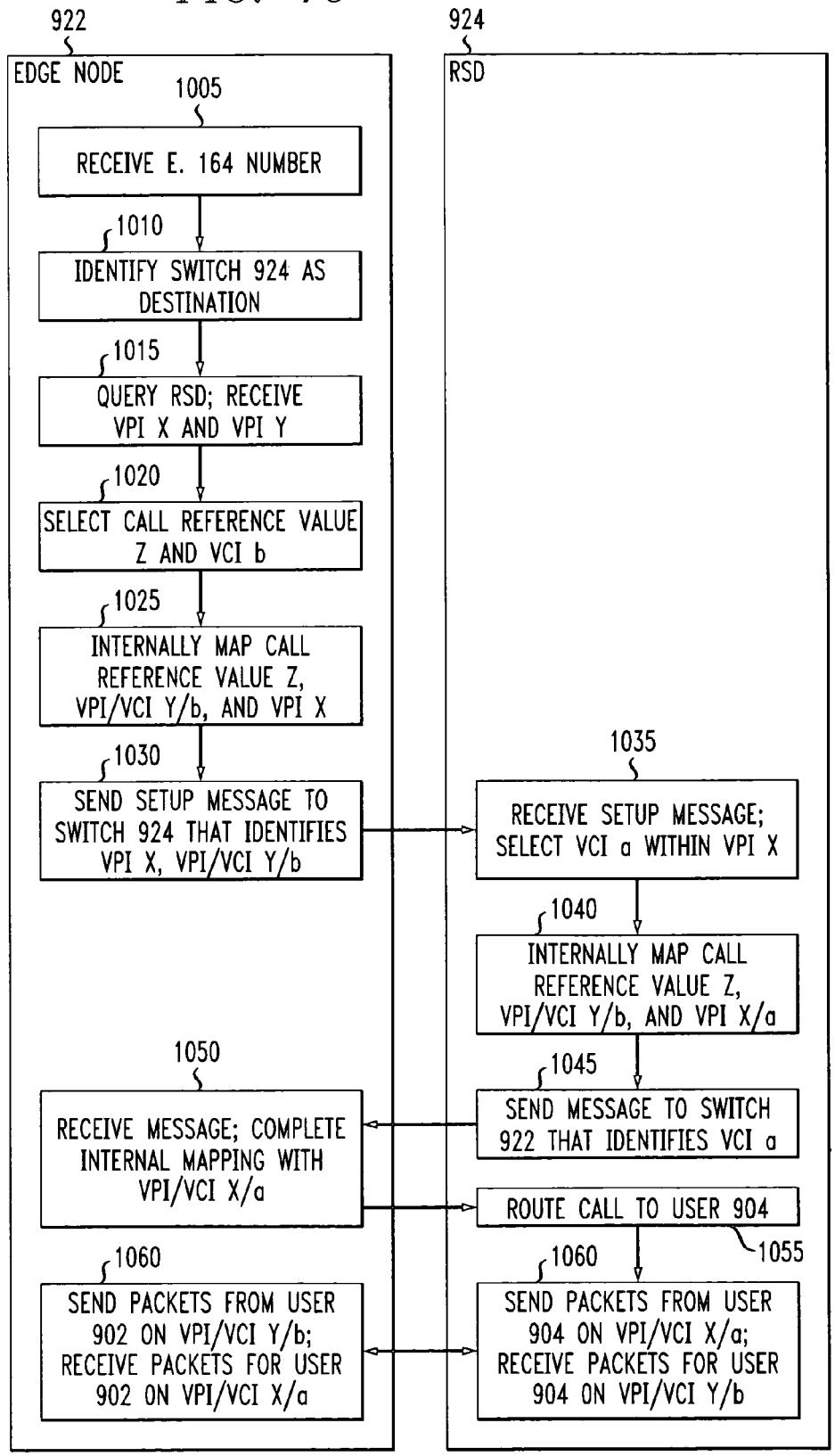
FIG. 10 shows a call flow for setting up a voice call carried over a packet network in accordance with various exemplary embodiments of the present invention.

FIG. 10 shows a flow diagram for setting up a voice call in accordance with a first of the third group of embodiments. FIG. 10 describes a method as practiced in the exemplary architecture of FIG. 9. The method of FIG. 10 provides a method of establishing two way communication between two users without the possibility of glare, i.e., a switch trying to use a VCI within a VPI that is already in use.

In a first step 1005, user 902 dials the E.164 number, i.e., the 10 digit telephone number, including area code, of user 904. User 902 is connected to ATM switch 922 via TDM switch 912 and TDM trunk 932, and the E.164 number is provided to ATM switch 922, using techniques known to the art.

In a second step 1010, ATM switch 922 identifies ATM switch 924 as the destination ATM switch for the call, based on the E.164 number.

In a third step 1015, ATM switch 922 queries an RSD to receive a VPI that defines a unique path through ATM backbone switches 952 through 959 to ATM switch 924. The RSD selects such a VPI in accordance with the first and second groups of embodiments, and sends the VPI to ATM switch 922. This VPI is referred to as VPI X.

The RSD also provides ATM switch 922 with a VPI Y that defines a unique path through ATM backbone switches 952 through 959 from ATM switch 924 to ATM switch 922. Alternatively, for each VPI X, a preselected VPI Y, preferably but not necessarily preselected by the RSD, may be stored within switch 922. Preferably, the RSD selects VPI Y based on the congestion status of the available routes between ATM switch 924 and ATM switch 922. VPI Y may, but does not necessarily, use the same links (but in the opposite direction) between the ATM backbone switches as VPI X.

In a fourth step 1020, ATM switch 922 selects a call reference value Z that will be used to identify the call during the signaling between ATM switch 922 and ATM switch 924 that will set up the call. ATM switch 922 also selects a VCI within VPI Y for the call, referred to as VCI b.

In a fifth step 1025, ATM switch 922 internally maps VPI X to VPI/VCI Y/b for call reference value Z.

In a sixth step 1030, ATM switch 922 sends a "setup" type of message, such as a SETUP message or an IAM (initial address message), depending on the protocol, to ATM switch 924, requesting ATM switch 924 to assign a VCI within VPI X for a call with call reference Z. This setup message also indicates that VPI/VCI Y/b should be used for packets sent from ATM switch 924 to ATM switch 922 for the call.

In a seventh step 1035, ATM switch 924 receives the setup type message, and selects a VCI within VPI X for the call. This VCI is referred to as VCI a.

In an eighth step 1040, ATM switch 924 internally maps VPI/VCI X/a to a VPI/VCI Y/b for call reference value Z.

In a ninth step 1045, ATM switch 924 sends a message, such as an IAM Acknowledge message or a CALL PROCEEDING message, to ATM switch 922 indicating that VCI a within VPI X should be used for packets sent from ATM switch 922 to ATM switch 924 during the call.

In a tenth step 1050, ATM switch 922 receives the message sent by ATM switch 924 in step 1045, and completes the mapping started in step 1025 such that VPI/VCI X/a is mapped to VPI/VCI Y/b for call reference value Z.

In an eleventh step 1055, ATM switch 924 routes the call to user 904 via TDM trunk 934 and TDM switch 914, using techniques known to the art.

In a twelfth step 1060, after the call is answered in accordance with techniques known to the art, ATM switch 922 receives voice data from user 902 and sends it in ATM packets to ATM switch 924 using VPI/VCI X/a, which then sends the voice data to user 904. Similarly, ATM switch 924 receives voice data from user 904 and sends it in ATM packets to ATM switch 922 using VPI/VCI Y/b, which then sends the voice data to user 902.

Glare does not occur in the first of the third group of embodiments, because ATM switch 922 selects VCI b, and ATM switch 924 selects VCI a. As a result, ATM switch 922 can select a VCI b that is not being used by any switch to send data to ATM switch 922 within VPI Y, and ATM switch 924 can select a VCI a that is not being used by any switch to send data to ATM switch 924 within VPI X.

In a second of the third group of embodiments, the method of the first of the third group of embodiments is modified to advantageously involve less processing in many situations, but with the possibility of glare, which may result in extra processing.

In particular, during step 4, ATM switch 922 selects a VCI a within VPI X for communications from ATM switch 922 to ATM switch 924. However, an ATM switch other than ATM switch 922 may already be using VPI/VCI X/a to send packets to ATM switch 924.

The VCI a selected by ATM switch 922 is included in the setup message sent to ATM switch 924 in the sixth step.

In the seventh step, ATM switch verifies that the VCI b selected by switch 922 is not in use. If VPI/VCI X/a is not in use, the method proceeds from the eighth step onward, with the exception that VCI a is not communicated to switch 922 in the ninth step. Rather, an acknowledgment may be sent. If VPI/VCI X/a is in use, ATM switch 924 selects a different VPI a' within VCI X, and the method proceeds from the eighth step onward, where the message sent in the ninth step indicates that VCI a was unsuitable, and that VCI a' should be used instead.

IP/MPLS

The illustrative embodiments discussed above with reference to FIGS. 1–10 speak in terms of an ATM network and ATM cells, but it should be understood that any circuit-switched packet network, such as a network which works in accordance with the IP/MPLS protocol, can employ the same principles. In such case of an IP/MPLS protocol, it should be appreciated that the ATM switches shown in the ATM network example would be replaced by IP/MPLS routers. That is, the exemplary IP/MPLS network 20' of FIG. 11 is similar to the ATM network 20 of FIGS. 1–4, with the exception that the ATM switches 110–180 of the ATM network 20 of FIGS. 1–4 have been replaced with IP/MPLS routers 110'–180' in IP/MPLS network 20' of FIG. 11.

Figure 11:
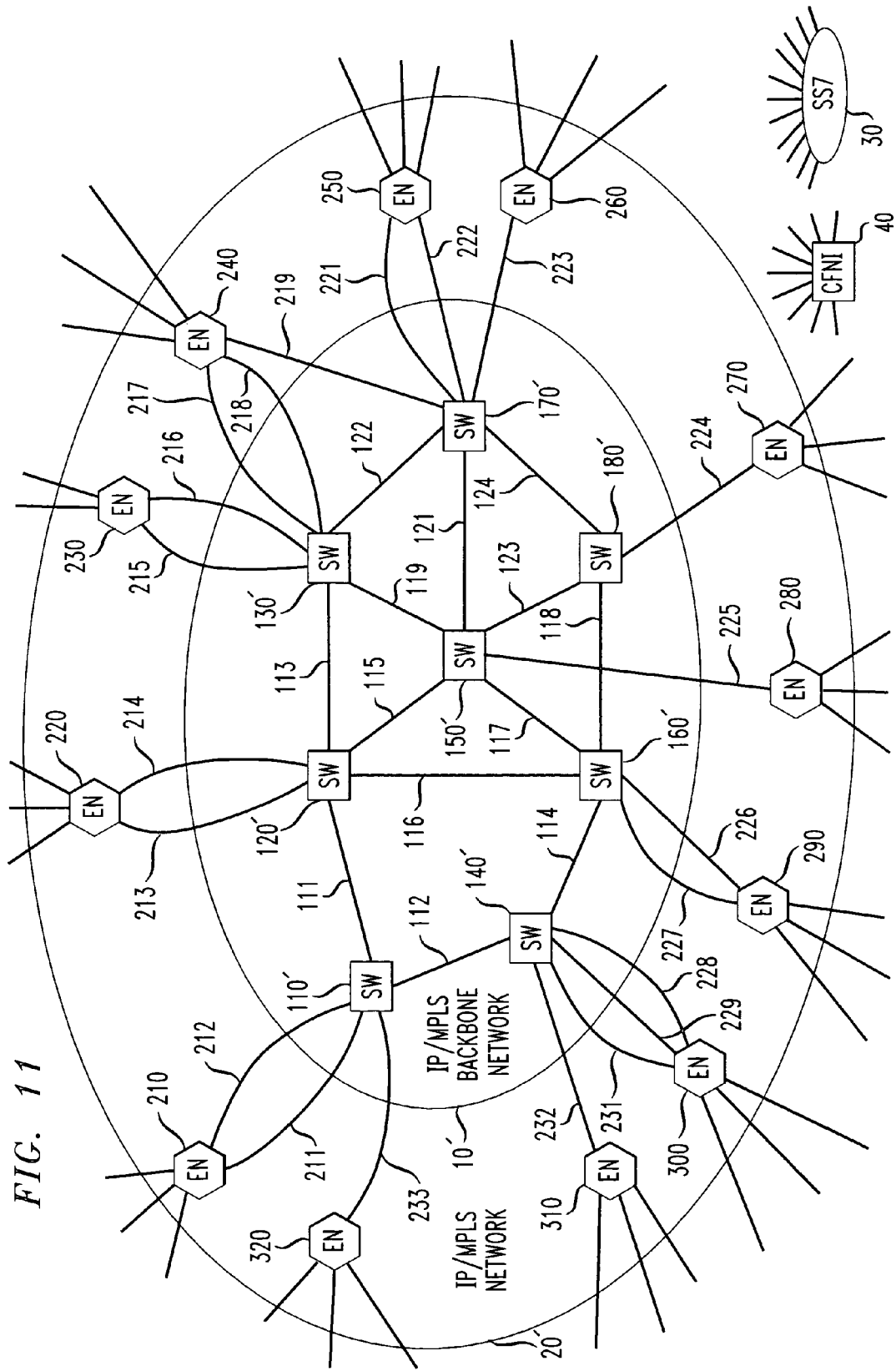
FIG. 11 illustrates another telecommunication system utilizing various exemplary embodiments of the present invention.

Furthermore, the exemplary IP/MPLS network of FIG. 11 is similar to the ATM network of FIGS. 5–7 and 9, with the exception that the ATM switch 51 of FIG. 5, the ATM switches 610 of FIG. 6, the ATM switches 710 of FIG. 7, and the ATM switches 922, 924, 952, 954, 956, 958 and 959 have been replaced with IP/MPLS routers in IP/MPLS network 20' of FIG. 11. Further, the communication referred to in FIG. 8 would be an IP session in an IP/MPLS network.

It should also be appreciated that, since the exemplary IP/MPLS network 20' of FIG. 11 is similar to that of the ATM networks of FIGS. 1–7 and 9, like elements are designated using the same numeral representation, and their detailed descriptions are thus omitted.

As shown in FIG. 11, the IP/MPLS network 20' includes an IP/MPLS backbone network 10'. Backbone network 10' includes backbone routers BB 110'–180' and backbone links, or β links, 111–119 and 121–124. Like network 20, network 20' also includes edge nodes 210–320 outside the IP/MPLS backbone network, and access links, or a links, 211–219, 221–229 and 231–233 which interconnect the edge nodes to the backbone routers.

In the IP/MPLS network 20', the first pre-provisioned path is associated with a first stack of labels. The first stack of labels defines a first path from a first source node, which is one of the plurality of edge nodes, to the destination edge node. This first path runs from the first source edge node to a backbone node selected from the group consisting of the first backbone nodes and the intermediary backbone nodes included in the first pre-provisioned path, and then along the first pre-provisioned path to the destination edge node. A second stack of labels defines a second path from a second source node, which is one of the plurality of edge nodes, to the destination edge node. This second path runs from the second source edge node to a backbone node selected from the group consisting of the first backbone node and the intermediary backbone nodes included in the first pre-provisioned path, and then along the first pre-provisioned path to the destination edge node. As a result, destination based routing to the destination node is implemented. Like the VPIs discussed above, the stack of labels defines a plurality of paths from a plurality of edge nodes to the destination node, similar to the way that the branches of a tree converge to a single trunk. Whereas in an ATM network, a sending ATM switch sends a data cell with VPI and VCI values, and the receiving ATM switch changes the VPI and/or the VCI value to switch, in an IP/MPLS network, a sending IP/MPLS router sends an IP packet attached with a set of labels, and a receiving IP/MPLS router swaps, removes and/or adds labels to switch routes.

Figure 12:
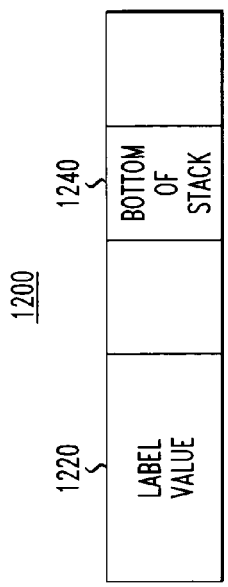
FIG. 12 shows an exemplary MPLS label stack entry used in various exemplary embodiments of the present invention.

FIG. 12 shows an exemplary embodiment of a label. As shown in FIG. 12, a label 1200 contains a plurality of fields including a label value field 1220 and a bottom of stack indicator 1240. The label value field 1220 provides the label identifier which corresponds to the path chosen. The bottom of stack indicator 1240 indicates whether the label is a bottom entry, and is set to 1 for the last entry in the stack of labels, and 0 for all other label stack entries.

Figure 13:
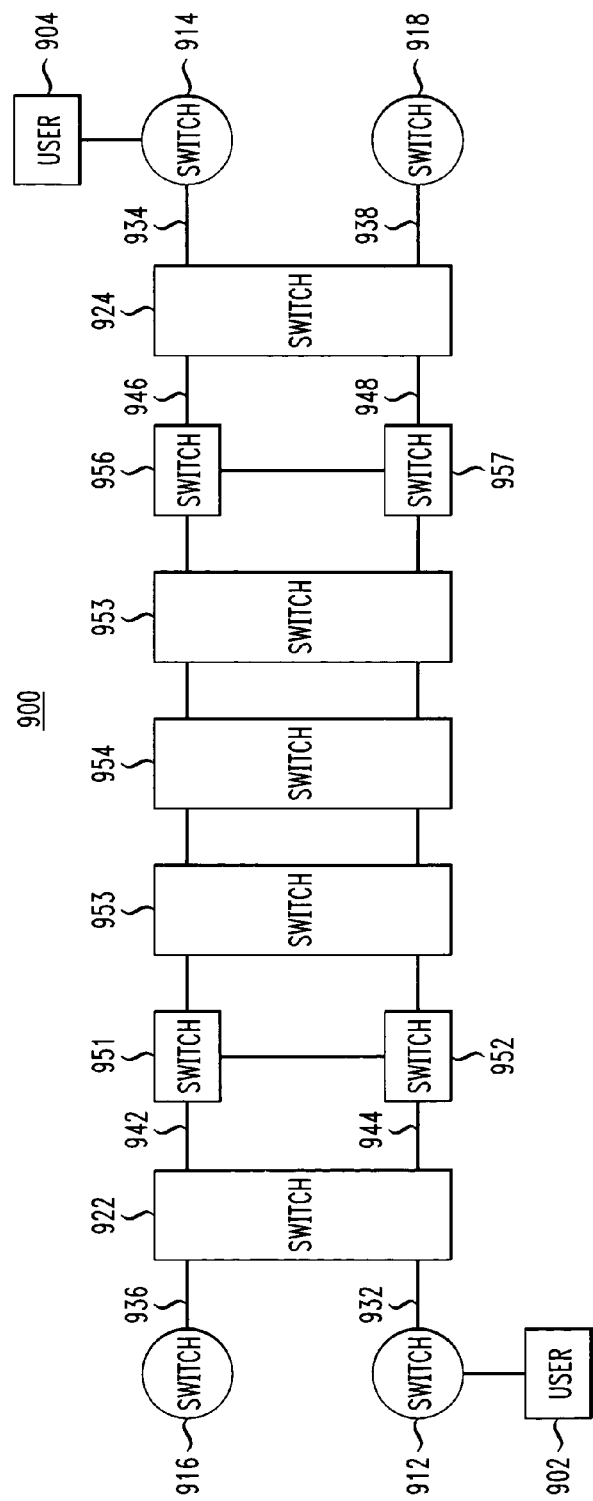
FIG. 13 shows an exemplary IP network architecture in more detail at the local level.

FIG. 13 shows the architecture of a network 900 in which the exemplary embodiments of an IP/MPLS system may be practiced. Network 900 includes Time Division Multiplex (TDM) switches 912, 914, 916 and 918, which may be, for example, central offices of a local telephone network. A user 902 is connected to TDM switch 912, and a user 904 is connected to TDM switch 914. Network 900 also includes edge nodes 922 and 924, which are analogous to the edge nodes of FIG. 11. Edge node 922 is connected to TDM switches 912 and 916 by TDM trunks 932 and 936, respectively. Edge node 924 is connected to TDM switches 914 and 918 by TDM trunks 934 and 938, respectively. Edge nodes 922 and 924 are adapted to terminate TDM trunks 932, 934, 936 and 938 for connectivity to TDM switches, as well as for connectivity to backbone routers. Network 900 also includes backbone routers 951 to 959, which are analogous to the backbone routers BB of FIG. 11. Backbone routers 951 and 952 are connected to edge node 922 by connections 942 and 944, respectively, and backbone routers 956 and 957 are connected to edge node 924 by connections 946 and 948, respectively. It should be appreciated that the backbone routers and edge nodes are all nodes of network 900, and that network 900 also has many other end nodes, routers and connections, which are not shown for clarity. It should also be appreciated that edge nodes 922 and 924 may also be directly connected to users.

In FIG. 13, backbone routers 951 to 957 function as label switched routers running IP/MPLS and are part of a larger network of such routers. In an exemplary embodiment, there are 3 label switched paths (LSPs) through backbone routers 951–957, including: 1) LSP1-6 from backbone router 951 to backbone router 956, 2) LSP2-7 from backbone router 952 to backbone router 957, and 3) LSP3-5 from backbone router 953 to backbone router 956, where LSP1-6 and LSP2-7 both use LSP3-5.

Figure 14:
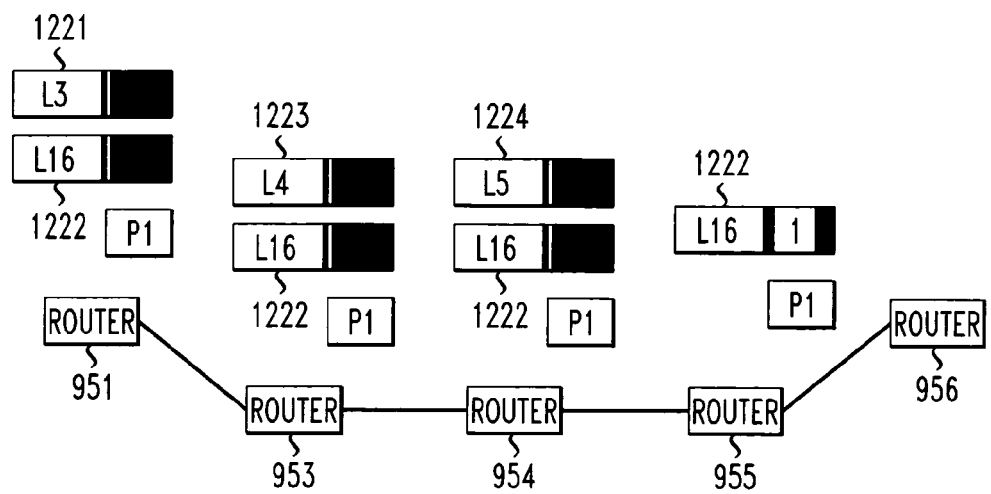
FIG. 14 illustrates a routing map from backbone BB 951 to backbone router BB 956 router of the FIG. 13 network, in accordance with various exemplary embodiments of the present invention.

FIG. 14 presents an exemplary illustrative routing map for LSP1-6. As shown in FIG. 14, backbone router 951 receives a packet P1, and attaches an IP/MPLS stack of labels with label 1221 providing label identifier L3 and label 1222 providing label identifier L16 that identifies the session from edge node 922 to edge node 924. Backbone router 951 then sends the attached packet P1 to backbone router 953. Backbone router 953 receives the packet P1 with the attached stack of labels, removes label 1221, adds label 1223 providing label identifier L4, and sends the packet P1 attached with the new stack of labels to backbone router 954. Backbone router 954 receives the packet P1 with the attached stack of labels, removes label 1223, adds label 1224 providing label identifier L5, and sends the packet P1 attached with the new stack of labels to backbone router 955. Backbone router 955 then receives the packet P1 with the attached stack of labels, removes label 1224, and sends the packet P1 attached with the new stack of labels to backbone router 956.

In the above exemplary embodiment, rules for the swapping, adding and removing of label stack entries 1221, 1223, and 1224 are based on standard MPLS logic which is programmed in the backbone routers 951–957 when the LSPs are established. In this exemplary embodiment of FIG. 14, backbone router 951 switches the packet P1 and constructs the stack of labels based on the IP header in the packet P1. Further, backbone router 953 switches the packet P1 attached with the stack of labels based on the label identifier L3. Similarly, backbone router 954 switches the packet P1 attached with the stack of labels based on the label identifier L4, and backbone router 955 switches the packet P1 attached with the stack of labels based on the label identifier L5, and then the label identifier L16. The logic in backbone router 955 is to remove the label 1224 providing label identifier L5, and then look at the next label 1222 providing label identifier L16 in the stack.

Figure 15:
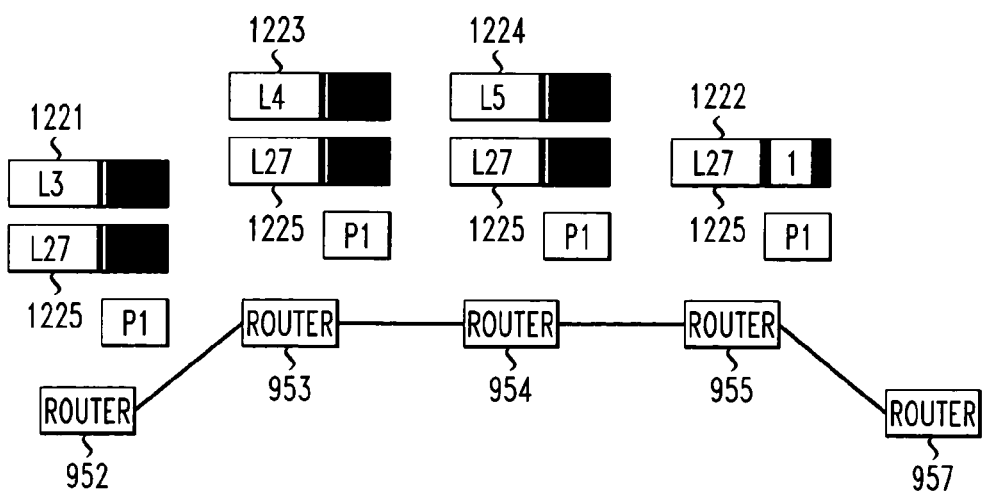
FIG. 15 illustrates a routing map from backbone router BB 952 to backbone router BB 957 of the FIG. 13 network, in accordance with various exemplary embodiments of the present invention.

FIG. 15 presents an exemplary illustrative routing map for LSP2-7. As shown in FIG. 15, backbone router 952 receives a packet P2, and attaches an IP/MPLS stack of labels with label 1221 providing label identifier L3 and label stack entry 1225 providing label identifier L27 that identifies the session from edge node 922 to edge node 924. Backbone router 952 then sends the attached packet P2 to backbone router 953. Backbone router 953 receives the packet P2 with the attached stack of labels, removes label 1221, adds label 1223 providing label identifier L4, and sends the packet P2 attached with the new stack of labels to backbone router 954. Backbone router 954 receives the packet P2 with the attached stack of labels, removes label 1223, adds label stack entry 1224 providing label identifier L5, and sends the packet P2 attached with the new stack of labels to backbone router 955. Backbone router 955 then receives the packet P2 with the attached stack of labels, removes label 1224, and sends the packet P2 attached with the new stack of labels to backbone router 957.

It should be appreciated that though the exemplary embodiments shown in FIGS. 14–15 show a stack of labels consisting of only 2 label stack entries, the embodiments of this invention are not limited to such stack size, and that the stack size in IP/MPLS may be larger than 2.

Figure 16:
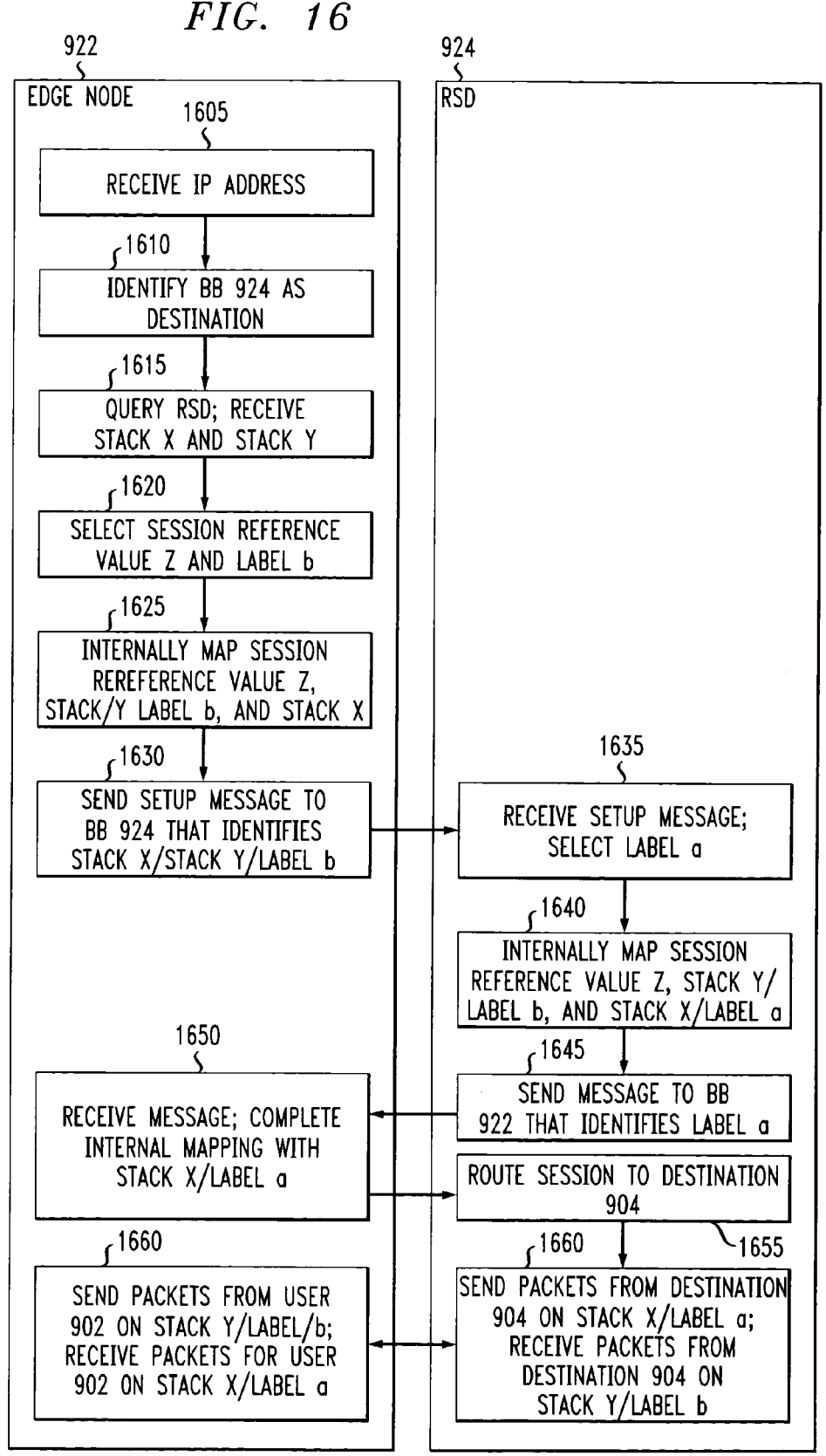
FIG. 16 shows a call flow for setting up a session over an IP packet network in accordance with various exemplary embodiments of the present invention.

FIG. 16 shows a flow diagram for setting up an IP/MPLS connection in accordance with the exemplary embodiments of this invention. The method described below illustrates setting IP/MPLS connection with reference to the exemplary architecture of FIG. 13.

In step 1605, user 902 enters the IP address of a destination 904. User 902 is connected to edge node 922 via switch 912 and trunk 932, and the IP address is provided to edge node 922, using techniques known to the art.

In step 1610, edge node 922 identifies edge node 924 as the destination for the session, based on the IP address.

In step 1615, edge node 922 queries an RSD to receive a stack of labels that defines a unique path through backbone routers 952 through 957 to edge node 924. The RSD selects such a stack of labels in accordance with the exemplary embodiments of this invention, and sends the stack of labels to edge node 922. This stack of labels is referred to as stack X.

The RSD may also provide edge node 922 with a stack Y that defines a unique path through backbone routers 952 through 959 from edge node 924 to edge node 922. Alternatively, for each stack X, a preselected stack Y, not necessarily preselected by the RSD, may be stored within edge node 922. The RSD may select stack Y based on the congestion status of the available routes between edge node 924 and edge node 922. Stack Y may, but does not necessarily, use the same links (but in the opposite direction) between the backbone routers as stack X.

In step 1620, edge node 922 selects a session reference value Z that will be used to identify the session during the signaling between edge node 922 and edge node 924 that will set up the session. Edge node 922 also selects a label identifier to identify the session in the direction from edge node 924 to edge node 922, referred to as Label b.

In step 1625, edge node 922 internally maps stack X to stack Y/Label b for session reference value Z.

In step 1630, edge node 922 sends a "setup" "setup" type of message, such as a SETUP message or an IAM (initial address message), depending on the protocol, to edge node 924, requesting edge node 924 to assign a label identifier for a session with session reference Z. This setup message also indicates that stack Y/Label b should be used for packets sent from edge node 924 to edge node 922 for the session.

In step 1635, edge node 924 receives the setup type message, and selects a label identifier for the session in the direction from edge node 922 to edge node 924. This label identifier is referred to as Label a.

In step 1640, edge node 924 internally maps stack X/Label a to stack Y/Label b for session reference value Z.

In step 1645, edge node 924 sends a message, such as an IAM Acknowledge message or a SESSION PROCEEDING message, to edge node 922 indicating that a label identifier should be used for IP packets sent from edge node 922 to edge node 924 during the session.

In step 1650, edge node 922 receives the message sent by edge node 924 in step 1645, and completes the mapping started in step 1625 such that stack X/Label a is mapped to stack Y/Label b for session reference value Z.

In step 1655, edge node 924 routes the session to destination 904 via trunk 934 and switch 914, using techniques known to the art.

In step 1660, after the session is started in accordance with techniques known to the art, edge node 922 receives data from user 902 and sends it in IP packets to edge node 924 using stack X/Label a, which then sends the data to destination 904. Similarly, edge node 924 receives data from destination 904 and sends it in IP packets to edge node 922 using stack Y/Label b, which then sends the IP data to user 902.

Figure 17:
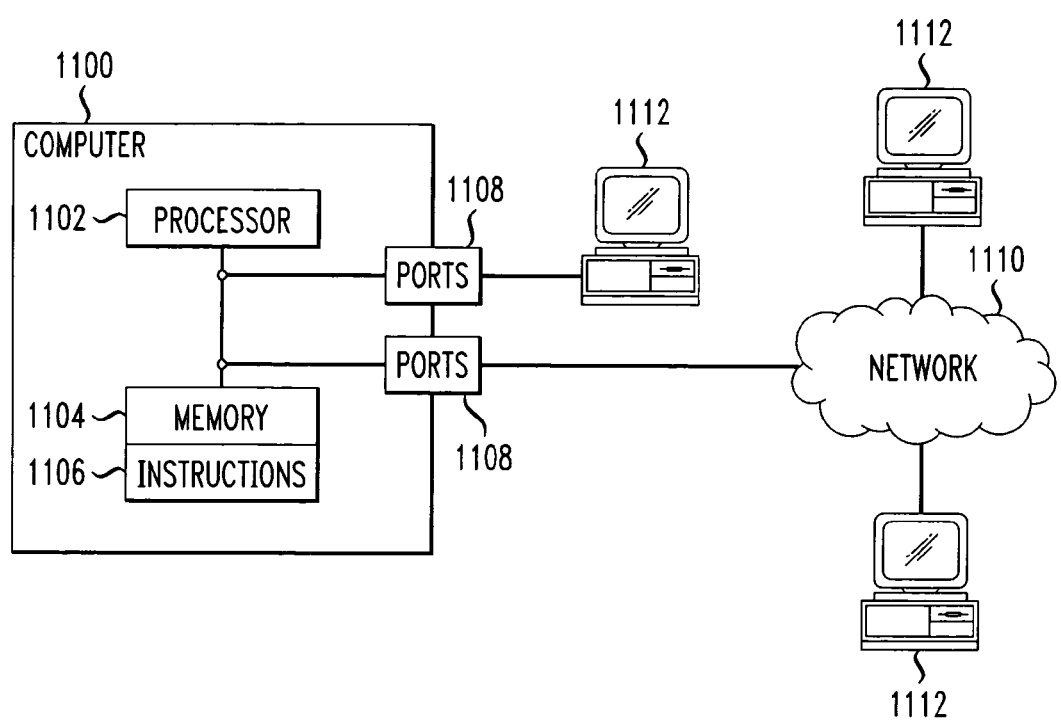
FIG. 17 shows exemplary embodiment of a computer used in connection with various exemplary embodiments of the present invention.

FIG. 17 shows a computer 1100 that may be used in connection with any of the nodes, routers and/or switches of the present invention. Computer 1100 comprises a processor 1102, memory 1104 adapted to store instructions 1106, and one or more ports 1108. Processor 1102 is adapted to communicate with memory 1104 and to execute instructions 1106. Processor 1102 and memory 1104 are also adapted to communicate with one or more ports 1108. Ports 1108 are adapted to communicate with other computers 1112, either directly or via a network, such as network 1110. Computers 1112 may have a configuration similar to that of computer 1100, and may be servers and/or clients. Computer 1100 may be a part of network 1110. Instructions 1106 may be adapted to carry out embodiments of the present invention.

Instructions 1106 may also be stored on any storage medium known to the art. Examples of a medium that stores instructions adapted to be executed by a processor include a hard drive, a floppy disk, a Read Only Memory (ROM), a Compact Disk ROM (CD-ROM), flash memory, and any other device that can store digital information. In one embodiment, the instructions are stored on the medium in a compressed and/or encrypted format. Compression of instructions on a storage medium is different from compression of a data signal, and the two should not be confused. As used herein, the phrase "adapted to be executed by a processor" is meant to encompass instructions stored in a compressed and/or encrypted format, as well as instructions that have to be compiled or installed by an installer before being executed by the processor.

While the present invention is described with respect to specific embodiments, these embodiments are not intended to limit the scope of the invention, which is defined by the appended claims.

What is claimed is:

1. A method of setting up a session from a first node, across a network that uses direct virtual path routing, to a second node, comprising:
   a. receiving at the first node a request to set up the session;
   b. identifying the second node as the destination of the session, based on the request;
   c. obtaining a first stack of labels that defines a first path from the first node across the network to the second node, and a second stack of labels that defines a second path from the second node across the network to the first node;
   d. selecting a first label identifier that identifies the session in a first direction from the first node to the second node;
   e. selecting a second label identifier that identifies the session in a second direction from the second node to the first node; and
   f. transmitting data from the first node to the second node using the first stack of labels and the first label identifier, and transmitting data from the second node to the first node using the second stack of labels and the second label identifier;
   wherein the session is an IP session.

2. At a first node, a method of setting up a session from the first node, across a network that uses direct virtual path routing, to a second node, comprising:
   a. receiving a request to set up the session;
   b. identifying the second node as the destination of the session, based on the request;
   c. obtaining a first stack of labels that defines a first path from the first node across the network to the second node, and a second stack of labels that defines a second path from the second node across the network to the first node;
   d. selecting a second label identifier that identifies the session in a second direction from the second node to the first node;
   e. sending a setup message to the second node that includes the identity of the first stack of labels and the second stack of labels, and the second label identifier;
   f. receiving from the second node a message that relates to a first label identifier that identifies the session in a first direction from the first node to the second node; and
   g. transmitting data to the second node using the first stack of labels and the first label identifier, and receiving data from the second node using the second stack of labels and the second label identifier;
   wherein the session is an IP session.

3. At a second node, a method of setting up a session from a first node, across a network that uses direct virtual path routing, to the second node, comprising:

a. receiving a setup message from the first node that defines a first stack of labels that defines a first path from the first node across the network to the second node, a second stack of labels that defines a second path from the second node across the network to the first node, and a second label identifier that identifies the session in a second direction from the second node to the first node;
b. making a decision relating to a first label identifier that identifies the session in a first direction from the first node to the second node;
c. sending a message to the first node relating to the first label identifier;
d. transmitting data to the first node using the second stack of labels and the second label identifier, and receiving data from the first node using the first stack of labels and the first label identifier;
wherein the session is an IP session.

4. A first node, comprising:
a memory that stores instructions for
  1. receiving a request to set up a session;
  2. identifying a second node as the destination of the session, based on the request;
  3. obtaining a first stack of labels that defines a first path from the first node across a network to the second node, and a second stack of labels that defines a second path from the second node across the network to the first node;
  4. selecting a second label identifier that identifies the session in a second direction from the second node to the first node;
  5. sending a setup message to the second node that includes the identity of the first stack of labels and the second stack of labels, and the second label identifier;
  6. receiving from the second node a message that relates to a first label identifier that identifies the session in a first direction from the first node to the second node; and
  7. transmitting data to the second node using the first stack of labels and the first label identifier, and receiving data from the second node using the second stack of labels and the second label identifier;
a processor adapted to communicate with the memory and to execute the instructions stored by the memory; and
a port adapted to communicate with the processor, the memory, and the second node;
wherein the session is an IP session.

5. A second node, comprising:
a memory that stores instructions for
  1. receiving a setup message from a first node that defines a first stack of labels that defines a first path from the first node across a network to the second node, a second stack of labels that defines a second path from the second node across the network to the first node, and a second label identifier that identifies a session in a second direction from the second node to the first node;
  2. making a decision relating a first label identifier that identifies the session in a first direction from the first node to the second node;
  3. sending a message to the first node relating to the first label identifier; and
  4. transmitting data to the first node using the second stack of labels and the second label identifier, and receiving data from the first node using the first stack of labels and the first label identifier;
a processor adapted to communicate with the memory and to execute the instructions stored by the memory; and
a port adapted to communicate with the processor, the memory, and the first node;
wherein the session is an IP session.

6. A method of setting up a session from a first node, across a network that uses direct virtual path routing, to a second node, comprising:
a. receiving at the first node a request to set up the session;
b. identifying the second node as the destination of the session, based on the request;
c. obtaining a stack of labels that defines a path from the first node across the network to the second node, wherein the stack of labels is selected by a routing status database;
d. selecting a label identifier that identifies the session in a predetermined direction from the first node to the second node; and
e. transmitting data from the first node to the second node using the stack of labels and the label identifier;
wherein the session is an IP session.

* * * * *